(12) United States Patent
Jun et al.

(10) Patent No.: US 7,834,947 B2
(45) Date of Patent: Nov. 16, 2010

(54) ARRAY SUBSTRATE, LIQUID CRYSTAL DISPLAY PANEL HAVING THE SAME AND LIQUID CRYSTAL DISPLAY DEVICE HAVING THE SAME

(75) Inventors: Sahng-Ik Jun, Seoul (KR); Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/509,193

(22) Filed: Jul. 24, 2009

(65) Prior Publication Data

US 2009/0278130 A1 Nov. 12, 2009

Related U.S. Application Data

(63) Continuation of application No. 11/323,586, filed on Dec. 29, 2005, now Pat. No. 7,573,537.

(30) Foreign Application Priority Data

Jan. 17, 2005 (KR) ................................. 2005-4275
Dec. 6, 2005 (KR) ............................. 2005-117915

(51) Int. Cl.
*G02F 1/1343* (2006.01)

(52) U.S. Cl. .............................. 349/38; 349/33; 349/39; 349/48

(58) Field of Classification Search .................... 349/38, 349/39, 42, 56, 48, 33, 144, 145, 146, 149; 257/72

See application file for complete search history.

(56) References Cited

U.S. PATENT DOCUMENTS

| 7,573,537 | B2 * | 8/2009 | Jun et al. ....................... 349/38 |
| 7,683,538 | B2 * | 3/2010 | Yoo et al. ..................... 313/512 |
| 2002/0022364 | A1 | 2/2002 | Hatta et al. ................. 438/373 |
| 2002/0036724 | A1 | 3/2002 | Ha .............................. 349/38 |
| 2002/0140877 | A1 | 10/2002 | Chen ........................... 349/38 |
| 2002/0180901 | A1 | 12/2002 | Kim ............................ 349/43 |
| 2006/0061262 | A1 * | 3/2006 | Yoo et al. ................... 313/503 |
| 2006/0170835 | A1 * | 8/2006 | Jun et al. ..................... 349/38 |

FOREIGN PATENT DOCUMENTS

JP      2005-004212      1/2005      ............... 349/38 X

* cited by examiner

*Primary Examiner*—Brian M Healy
(74) *Attorney, Agent, or Firm*—Innovation Counsel LLP

(57) ABSTRACT

In an array substrate, an LCD panel having the same and an LCD device having the same, the array substrate may include an insulating substrate, a switching element (e.g., a transistor such as a TFT), a main pixel portion, a coupling capacitor and a sub-pixel portion. The switching element may be formed on the insulating substrate in a pixel region defined by gate and data lines adjacent to each other. The gate and data lines may be formed on the insulating substrate. The main pixel portion is on a first (e.g., central) portion of the pixel region. The coupling capacitor is electrically connected to the switching element. The coupling capacitor is on the insulating substrate. The sub-pixel portion is electrically connected to the coupling capacitor. The sub-pixel portion is on a second (e.g., peripheral) portion of the pixel region. Therefore, an image display quality is improved.

50 Claims, 23 Drawing Sheets

ARRAY SUBSTRATE, LIQUID CRYSTAL DISPLAY PANEL HAVING THE SAME AND LIQUID CRYSTAL DISPLAY DEVICE HAVING THE SAME

CROSS-REFERENCE TO RELATED APPLICATION

This application is a continuation of U.S. patent application Ser. No. 11/323,586 filed on Dec. 29, 2005 now U.S. Pat. No. 7,573,537, which claims priority to Korean Patent Application No. 2005-04275, filed on Jan. 17, 2005, and Korean Patent Application No. 2005-117915, filed on Dec. 6, 2005, and all the benefits accruing therefrom under 35 U.S.C. §119, and the contents of which in their entirety are herein incorporated by reference.

BACKGROUND OF THE INVENTION

1. Field of the Invention

The present invention relates to an array substrate, a liquid crystal display (LCD) panel having the array substrate and an LCD device having the array substrate. More particularly, the present invention relates to an array substrate capable of improving an image display quality, a liquid crystal display (LCD) panel having the array substrate and an LCD device having the array substrate.

2. Description of the Related Art

An LCD device, in general, may include an array substrate, a color filter substrate and a liquid crystal layer. The array substrate may include a plurality of thin film transistors (TFTs) that are control pixels. The color filter substrate has a common electrode. The liquid crystal layer is sealed between the array substrate and the color filter substrate. A light transmittance of the liquid crystal layer is changed in response to an electric field applied to the liquid crystal layer, thereby displaying an image.

The variation of the light transmittance is restricted in a predetermined range, and as a result the LCD device has a relatively narrow viewing angle. In order to increase the viewing angle of the LCD device, the LCD device may implement a vertical alignment (VA) mode.

The LCD device configured to implement the VA mode may include two substrates and a liquid crystal layer incorporating a liquid crystal material with a dielectric constant exhibiting negative anisotropy. Liquid crystals in the liquid crystal layer have a homeotropic alignment mode.

In operation, when a voltage is not applied to the substrates, the liquid crystals are aligned in a vertical direction to display black. When a voltage at least equal to $V_0$ is applied to the substrates (e.g., to control electrodes of the array substrate and associated common electrodes of the color filter substrate), the liquid crystals are aligned in a horizontal direction to display white. When a voltage less then $V_0$ is applied to the substrates, the liquid crystals are inclined with respect to the horizontal direction to display gray, where the gray scale is dependent on the average orientation of the molecules of the liquid crystal material.

In a small-screen LCD device, the LCD device is configured to implement a patterned vertical alignment (PVA) mode to increase the viewing angle and to decrease a gray-scale inversion. An LCD device in the PVA mode has a patterned common electrode and a patterned pixel electrode.

In some available LCD devices, a voltage applied to each of the pixels is unstable so that the pixel flickers, resulting in a deterioration of the quality of the image display.

SUMMARY OF THE INVENTION

The present invention provides an array substrate capable of improved image display quality.

The present invention also provides a liquid crystal display (LCD) panel having the above-mentioned array substrate.

The present invention also provides an LCD device having the above-mentioned array substrate.

An array substrate in accordance with an aspect of the present invention may include an insulating substrate, a switching element (e.g., a switch such as a transistor, which may be a TFT), a main pixel portion, a coupling capacitor and a sub-pixel portion. The switching element is on the insulating substrate in a pixel region defined by gate and data lines adjacent to each other. For example, the pixel region may be defined by a first gate line and an adjacent first data line, and further defined by a second gate line consecutive to the first gate line and a second data line consecutive to the first data line. The gate and data lines are on the insulating substrate. The main pixel portion is on a first (e.g., central) portion of the pixel region. The coupling capacitor is electrically connected to the switching element. The coupling capacitor is on the insulating substrate. The sub-pixel portion is electrically connected to the coupling capacitor. The sub-pixel portion is on a second (e.g., peripheral) portion of the pixel region.

An array substrate in accordance with another aspect of the present invention may include an insulating substrate, a main gate line, a main switch, a main pixel portion, a sub-gate line, a sub-switch and a sub-pixel portion. The insulating substrate has a pixel region. The main gate line is on the pixel region. The main switch is on the insulating substrate. The main switch element is electrically connected to the main gate line. The main pixel portion is on a central portion of the pixel region. The main pixel portion is electrically connected to the main switch. The sub-gate line is on the pixel region. The sub-switch is on the insulating substrate. The sub-switch is electrically connected to the sub-gate line. The sub-pixel portion is on a peripheral portion of the pixel region.

An LCD panel in accordance with an exemplary embodiment of the present invention may include an upper substrate, a lower substrate and a liquid crystal layer. The upper substrate has a transparent substrate and a common electrode on the transparent substrate. The lower substrate may include an insulating substrate, a main pixel, a coupling capacitor and a sub-pixel portion. The insulating substrate has a pixel region defined by gate and data lines adjacent to each other. The gate and data lines are on the insulating substrate. The main pixel portion is on a first (e.g., central) portion. The coupling capacitor is electrically connected to a switching element on the insulating substrate. The sub-pixel portion is electrically connected to the coupling capacitor. The sub-pixel portion is on a peripheral portion of the pixel region. The liquid crystal layer is interposed between the upper and the lower substrates.

An LCD device in accordance with an exemplary embodiment of the present invention may include an upper substrate, a lower substrate and a liquid crystal layer. The upper substrate has a transparent substrate and a common electrode on the transparent substrate. The lower substrate may include an insulating substrate, a gate line, a data line, a switching element, a main pixel, a first coupling capacitor, a first sub-pixel portion, a second coupling capacitor and a second sub-pixel portion. The gate line is on the insulating substrate to transmit a gate signal. The data line is on the insulating substrate to transmit a data signal. The switching element is electrically connected to the gate and data lines. The switching element is on the insulating substrate. The main pixel portion is electrically connected to the switching element. The main pixel portion is on the insulating substrate. The first coupling capacitor has a first end that is electrically connected to the switching element. The first sub-pixel portion is electrically connected to the switching element through the first coupling capacitor. The first sub-pixel portion is on the insulating substrate. The second coupling capacitor has an end that is electrically connected to the switching element. The second sub-pixel portion is electrically connected to the switching element through the second coupling capacitor. The second sub-pixel portion is on the insulating substrate. The liquid crystal layer is interposed between the upper and the lower substrates.

According to some embodiments of the present invention, a total gate-source capacitance is divided into a gate-source capacitance of a gate-source capacitor and an additional gate-source capacitance of an additional gate-source capacitor. The gate-source capacitor and the additional gate-source capacitor correspond to the main electrode and the sub-electrode, respectively. As a result, a kickback voltage of the main electrode is decreased, and an image display quality of the LCD device is improved.

BRIEF DESCRIPTION OF THE DRAWINGS

The above and other aspects of the present invention will become more apparent by describing in detail exemplary embodiments thereof with reference to the accompanying drawings, in which.

DETAILED DESCRIPTION

Figure 1:
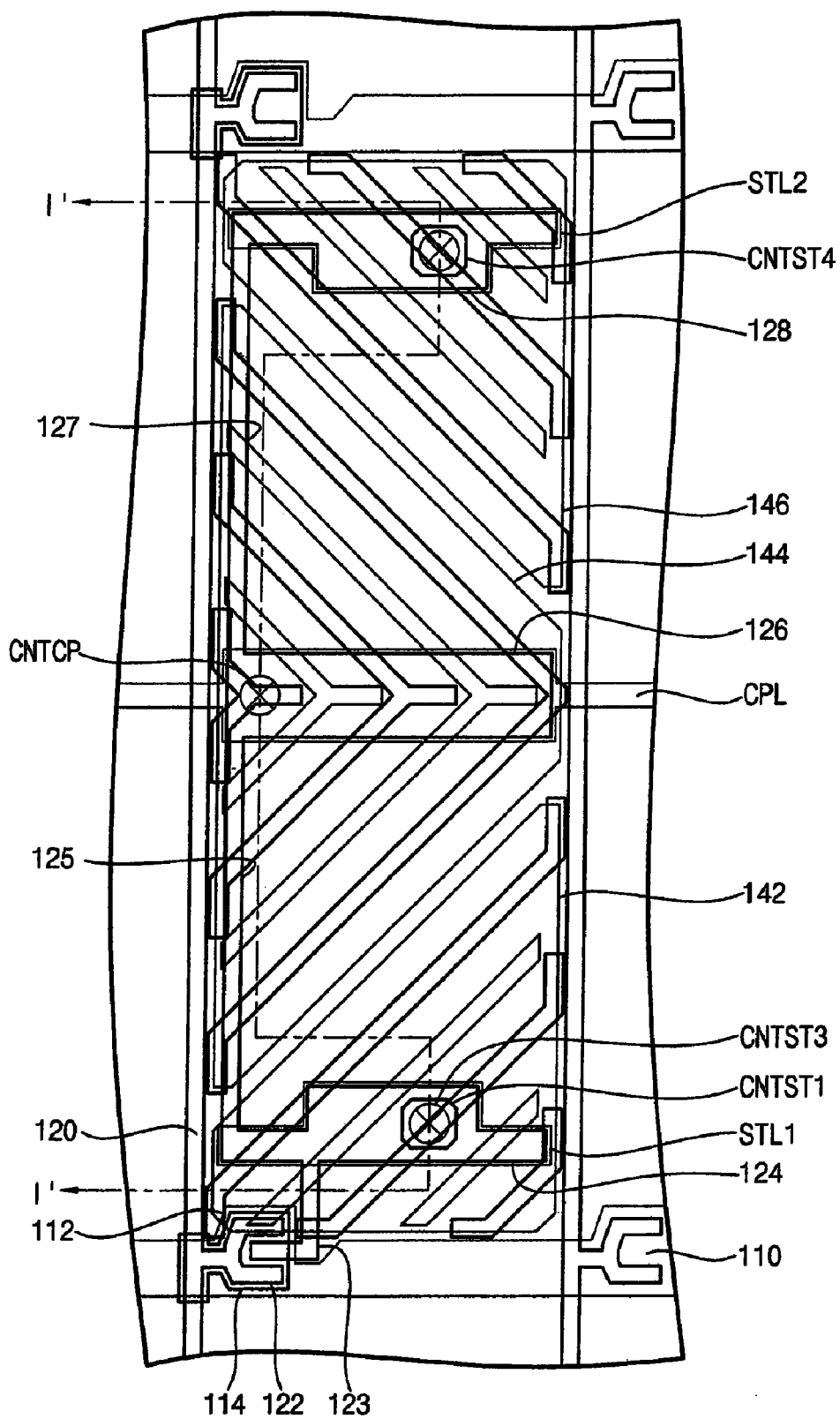
FIG. 1 is a plan view showing an LCD panel in accordance with an exemplary embodiment of the present invention.

Embodiments of the invention are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully describe the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. Reference to a "first" element etc. does not imply the need for "second" or additional elements.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising,"

"includes," and/or "including," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be described in detail with reference to the accompanying drawings.

Figure 2:
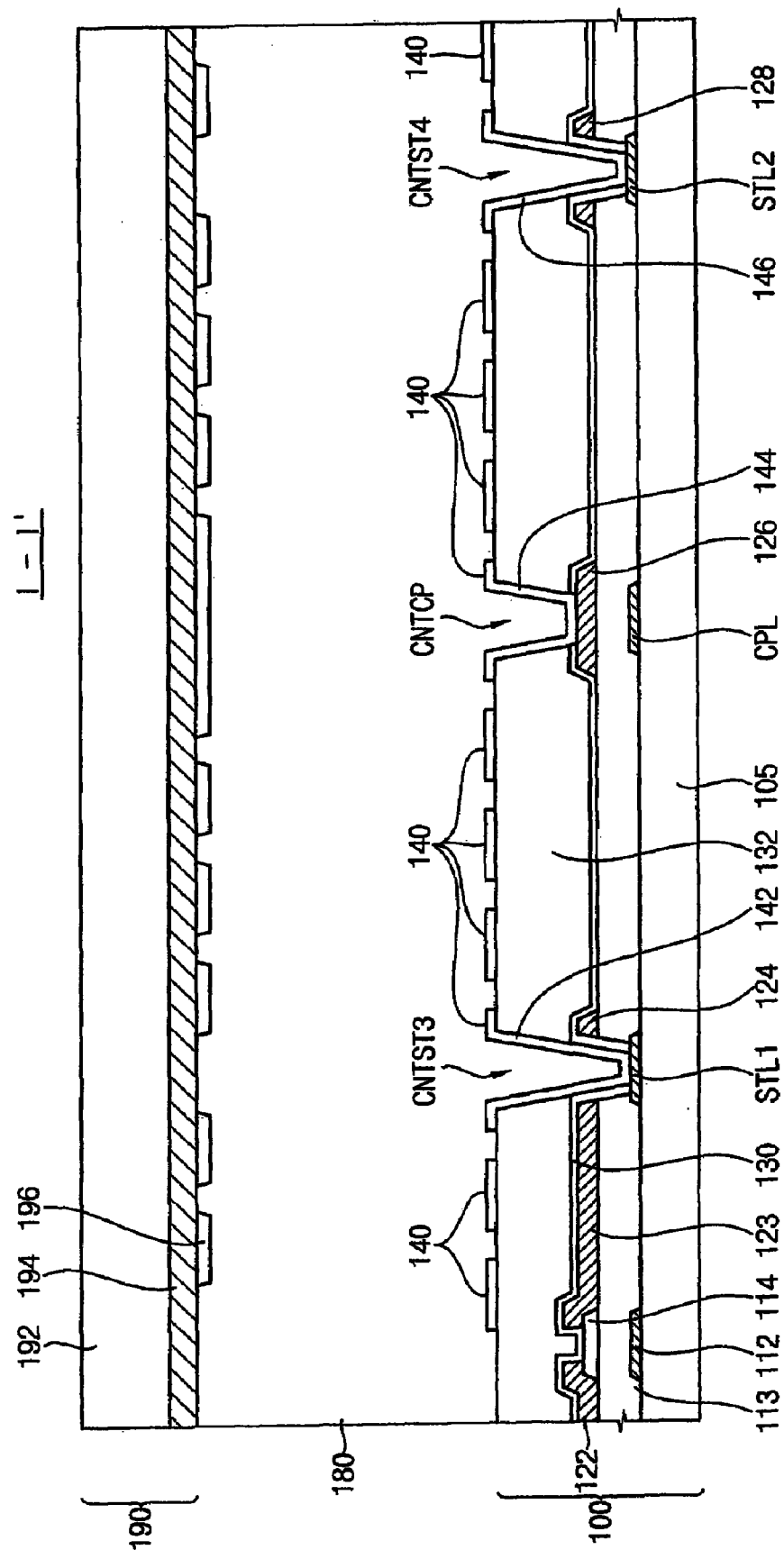
FIG. 2 is a cross-sectional view taken along a line I-I' shown in FIG. 1.

FIG. 1 is a plan view showing an LCD panel in accordance with an exemplary embodiment of the present invention. FIG. 2 is a cross-sectional view taken along a line I-I' shown in FIG. 1. The exemplary embodiment of FIGS. 1 and 2 shows a transmissive type LCD panel.

Referring to FIGS. 1 and 2, the LCD panel may include an array substrate 100, a liquid crystal layer 180 and a color filter substrate 190. The color filter substrate 190 is combined with the array substrate 100 so that the liquid crystal layer 180 is interposed between the array substrate 100 and the color filter substrate 190.

The array substrate 100 may include a gate line 110 that extends in a horizontal direction, a gate electrode 112 that is electrically connected to the gate line 100, first and second lower storage patterns STL1 and STL2 that are spaced apart from the gate line 110 in a pixel region and substantially parallel to the gate line 110, and a first coupling pattern CPL that divides the pixel region into two regions. The array substrate 100 may include a plurality of gate lines 110, a plurality of gate electrodes 112, a plurality of pixel regions and a plurality of first coupling patterns CPL.

The array substrate 100 may include an insulating substrate 105 comprising silicon nitride, silicon oxide, and/or other insulating material. The array substrate 100 may further include a gate insulating layer 113 and an active layer 114. The gate insulating layer 113 is on the insulating substrate 105 having the gate line 110 and the gate electrode 112. The active layer 114 is on the gate insulating layer 113 at a position corresponding to the gate electrode 112. The active layer 114 comprises a semiconductor layer such as amorphous silicon, polysilicon, and/or other appropriate material, and an impurity implanted semiconductor layer comprising N+ amorphous silicon, N+ polysilicon, and/or other appropriate material.

The array substrate 100 may include a source line 120 that extends in a longitudinal direction, a source electrode 122 that is electrically connected to the source line 120, and a drain electrode 123 that is spaced apart from the source electrode 122. The array substrate 100 may include a plurality of source lines 120, a plurality of source electrodes 122, and a plurality of drain electrodes 123. Gate electrodes 112, active layer 114 (including the semiconductor layers and the impurity implanted semiconductor layers), the source electrodes 122 and the drain electrodes 123 form one or more thin film transistors (TFTs).

The array substrate 100 may further include a first upper storage pattern 124 that is electrically connected to the drain electrode 123, a first extended pattern 125 that is electrically connected to the drain electrode 123 on a left side of the pixel region, a second coupling pattern 126 that is electrically connected to the first extended pattern 125, a second extended pattern 127 that is electrically connected to the first extended pattern 125 on the left side of the pixel region, and a second upper storage pattern 128 that is electrically connected to the second extended pattern 127.

The gate line 110 may have a mono-layered structure or a multi-layered structure. When the gate line 110 has a mono-layered structure, the gate line 110 may include aluminum, aluminum-neodymium alloy, etc. When the gate line 110 has the multi-layered structure, the gate line 110 may include a lower layer portion having chromium, molybdenum, molybdenum alloy, and/or other appropriate material, and an upper layer portion having aluminum, aluminum alloy, and/or other appropriate material.

The array substrate 100 may further include a passivation layer 130 and an organic insulating layer 132. The passivation layer 130 covers the TFT. The passivation layer 130 and the organic insulating layer 132 have a contact hole through which the drain electrode 123 is partially exposed. The passivation layer 130 and the organic insulating layer 132 protect the active layer 114 between the source electrode 122 and the drain electrode 123. The TFT is electrically insulated from a pixel electrode member 140 by the passivation layer 130 and the organic insulating layer 132. The active layer 114 may include a semiconductor layer and a doped (e.g., impurity implanted) semiconductor layer.

A height of the organic insulating layer 132 is controlled so that a thickness of the liquid crystal layer 180 is controlled. In some embodiments, the passivation layer 130 may be omitted.

The array substrate 100 may further include the pixel electrode member 140 that is electrically connected to the drain electrode 123 of the TFT through the contact hole. The pixel electrode member 140 has opening patterns.

In particular, the pixel electrode member 140 may include a main electrode 144, a first sub-electrode 142 and a second sub-electrode 146. The main electrode 144 is electrically connected to the second coupling pattern 126. The first sub-electrode 142 is electrically connected to the first lower storage pattern STL1. The second sub-electrode 146 is spaced apart from the first sub-electrode 142, and electrically connected to the second lower storage pattern STL2.

The main electrode 144 has two Y-shaped opening patterns that are symmetrical with respect to a central line of the pixel region in the horizontal direction of the pixel region. A central portion of each of the Y-shaped opening patterns has two adjacent rods that form about 90°. The first sub-electrode 142 has two linear opening patterns that are substantially parallel to one of the two adjacent rods of each of the Y-shaped opening patterns. The second sub-electrode 146 has two linear opening patterns that are substantially parallel to another of the two adjacent rods of each of the Y-shaped opening patterns. The linear opening patterns of the first sub-electrode 142 are symmetrical to the linear opening patterns of the second sub-electrode 146 with respect to the central line. In operation, a plurality of domains are formed adjacent to the opening patterns of the pixel electrode member 140 in the liquid crystal layer 180.

The main electrode 144 and the first and second sub-electrodes 142 and 146 may comprise a transparent conductive material such as indium tin oxide (ITO), amorphous indium tin oxide (a-ITO), indium zinc oxide (IZO), zinc oxide (ZO), and/or other transparent conductive material.

The color filter substrate 190 may include a transparent substrate 192, a color filter layer 194 on the transparent substrate 192, a common electrode 196 on the color filter layer 194. The common electrode 196 covers the opening patterns of the pixel electrode member 140, and is partially opened. The color filter substrate 190 is attached to the array substrate 100 to seal the liquid crystal layer 180. In this exemplary embodiment, the liquid crystal layer 180 has a vertical alignment (VA) mode.

The domains are formed by the main electrode 144 and the first and second sub-electrodes 142 and 146 so that a rubbing process of the array substrate 100 and/or the color filter substrate 190 may be omitted. In addition, an alignment layer (not shown) may also be omitted.

Figure 3:
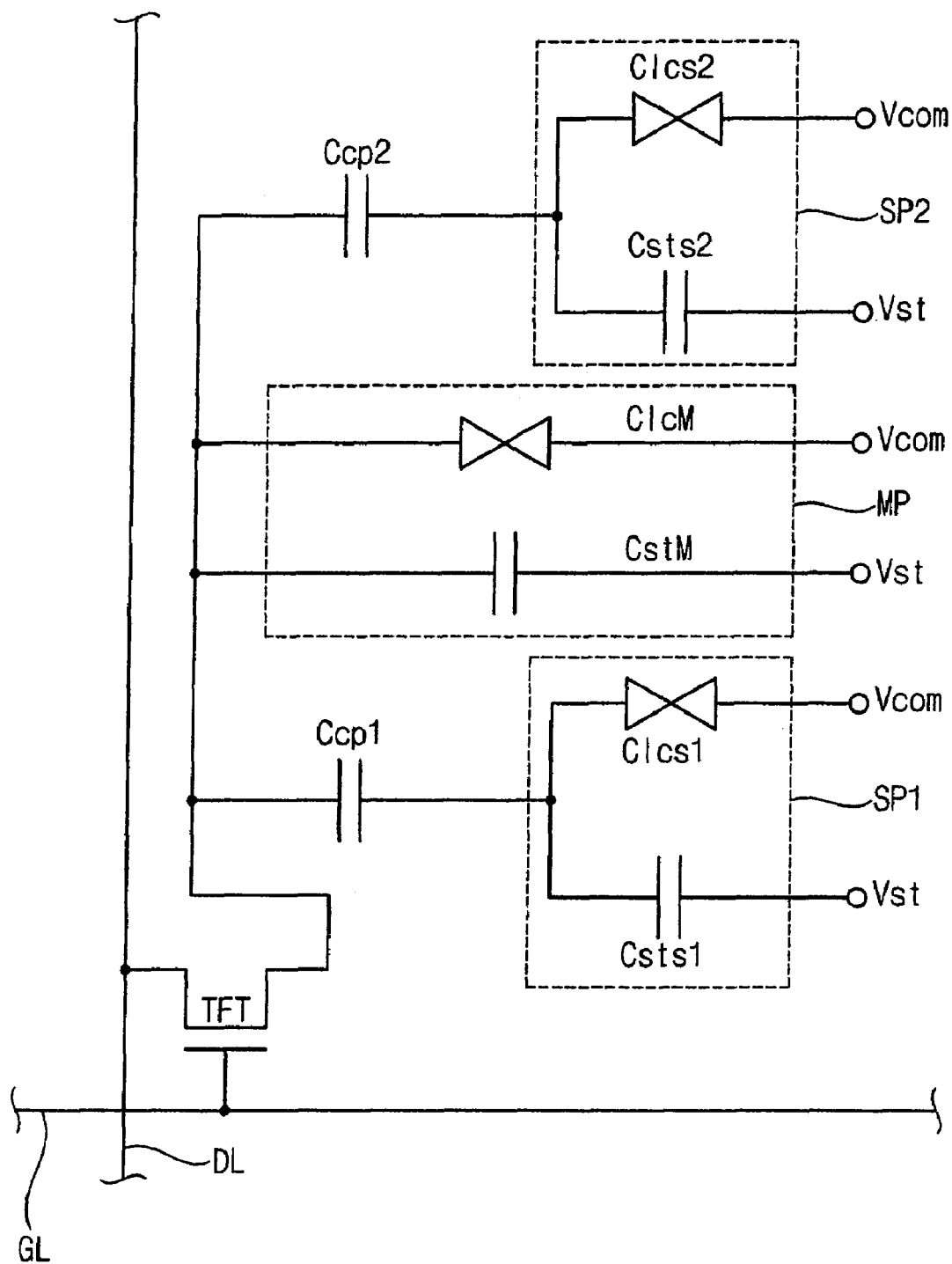
FIG. 3 is a circuit diagram showing an array substrate shown in FIG. 2.

FIG. 3 is a circuit diagram showing an array substrate shown in FIG. 2.

Referring to FIG. 3, the LCD device may include a gate line GL, a data line DL, a thin film transistor TFT, a main pixel portion MP, a first coupling capacitor Ccp1, a first sub-pixel portion SP1, a second coupling capacitor Ccp2 and a second sub-pixel portion SP2.

A gate signal is applied to the thin film transistor TFT through the gate line GL. A data signal is applied to the thin film transistor TFT through the data line DL.

The main pixel portion MP may include a main liquid crystal capacitor ClcM and a main storage capacitor CstM. One end of the main liquid crystal capacitor ClcM is electrically connected to the thin film transistor TFT, and a common voltage Vcom is applied to the other end of the main liquid crystal capacitor ClcM. One end of the main storage capacitor CstM is electrically connected to the thin film transistor TFT, and a storage voltage Vst is applied to the other end of the main storage capacitor CstM.

One end of the first coupling capacitor Ccp1 is electrically connected to the thin film transistor TFT, and the other end of the first coupling capacitor Ccp1 is electrically connected to the first sub-pixel portion SP1.

The first sub-pixel portion SP1 may include a first liquid crystal capacitor Clcs1 and a first storage capacitor Csts1. One end of the first liquid crystal capacitor Clcs1 is electrically connected to the first coupling capacitor Ccp1, and the common voltage is applied to the other end of the first liquid crystal capacitor Clcs1. One end of the first storage capacitor Csts1 is electrically connected to the first coupling capacitor Ccp1, and the storage voltage Vst is applied to the other end of the first storage capacitor Csts1.

One end of the second coupling capacitor Ccp2 is electrically connected to the thin film transistor TFT, and the other end of the second coupling capacitor Ccp2 is electrically connected to the second sub pixel portion SP2.

The second sub-pixel portion SP2 may include a second liquid crystal capacitor Clcs2 and a second storage capacitor Csts2. One end of the second liquid crystal capacitor Clcs2 is electrically connected to the second coupling capacitor Ccp2, and the common voltage Vcom is applied to the other end of the second liquid crystal capacitor Clcs2. One end of the second storage capacitor Csts2 is electrically connected to the second coupling capacitor Ccp2, and the storage voltage Vst is applied to the other end of the second storage capacitor Csts2.

Figure 4:
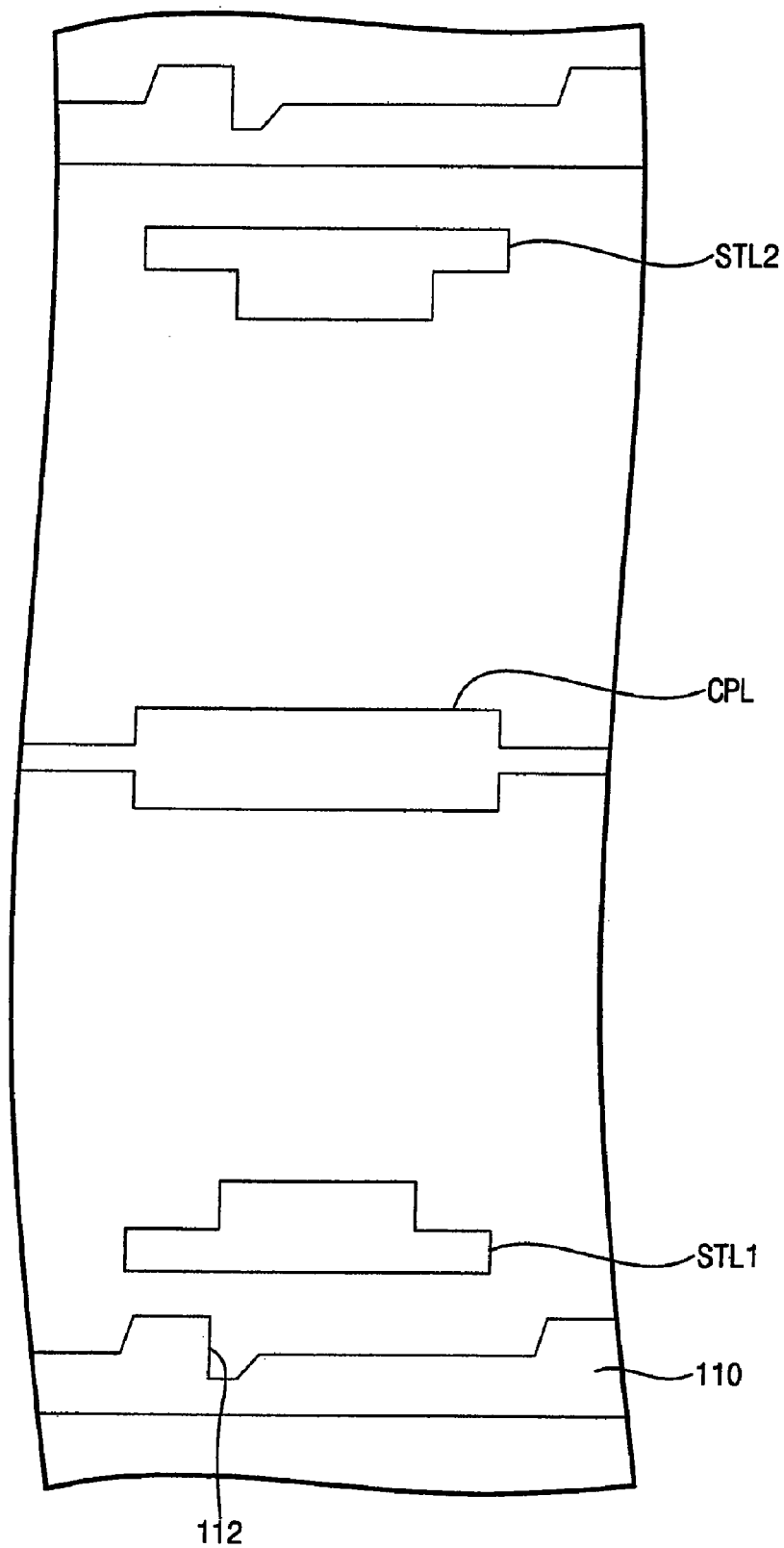
FIGS. 4 to 8 are plan views showing a method of manufacturing the array substrate shown in FIG. 3.
Figure 5:
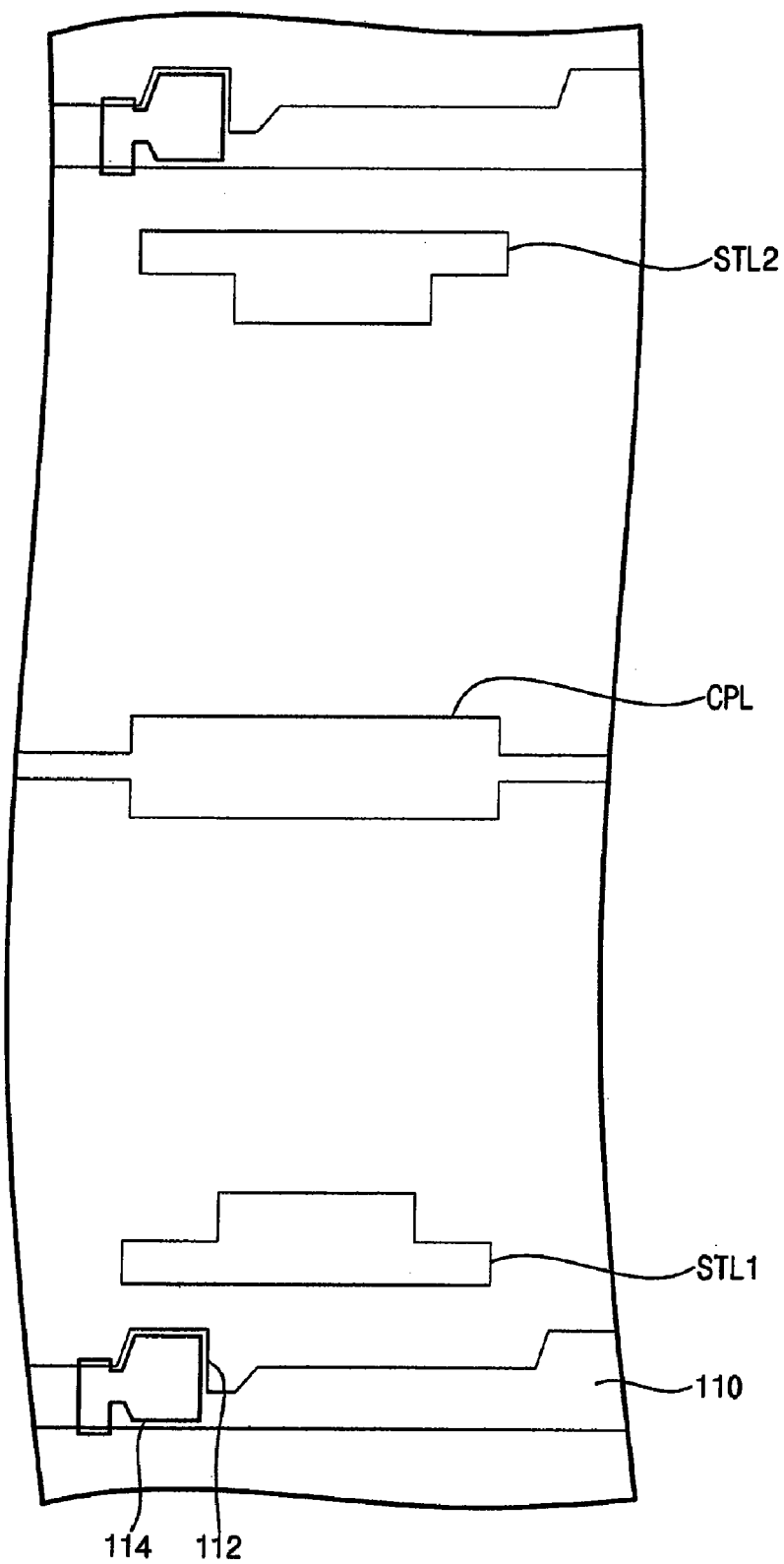
Figure 6:
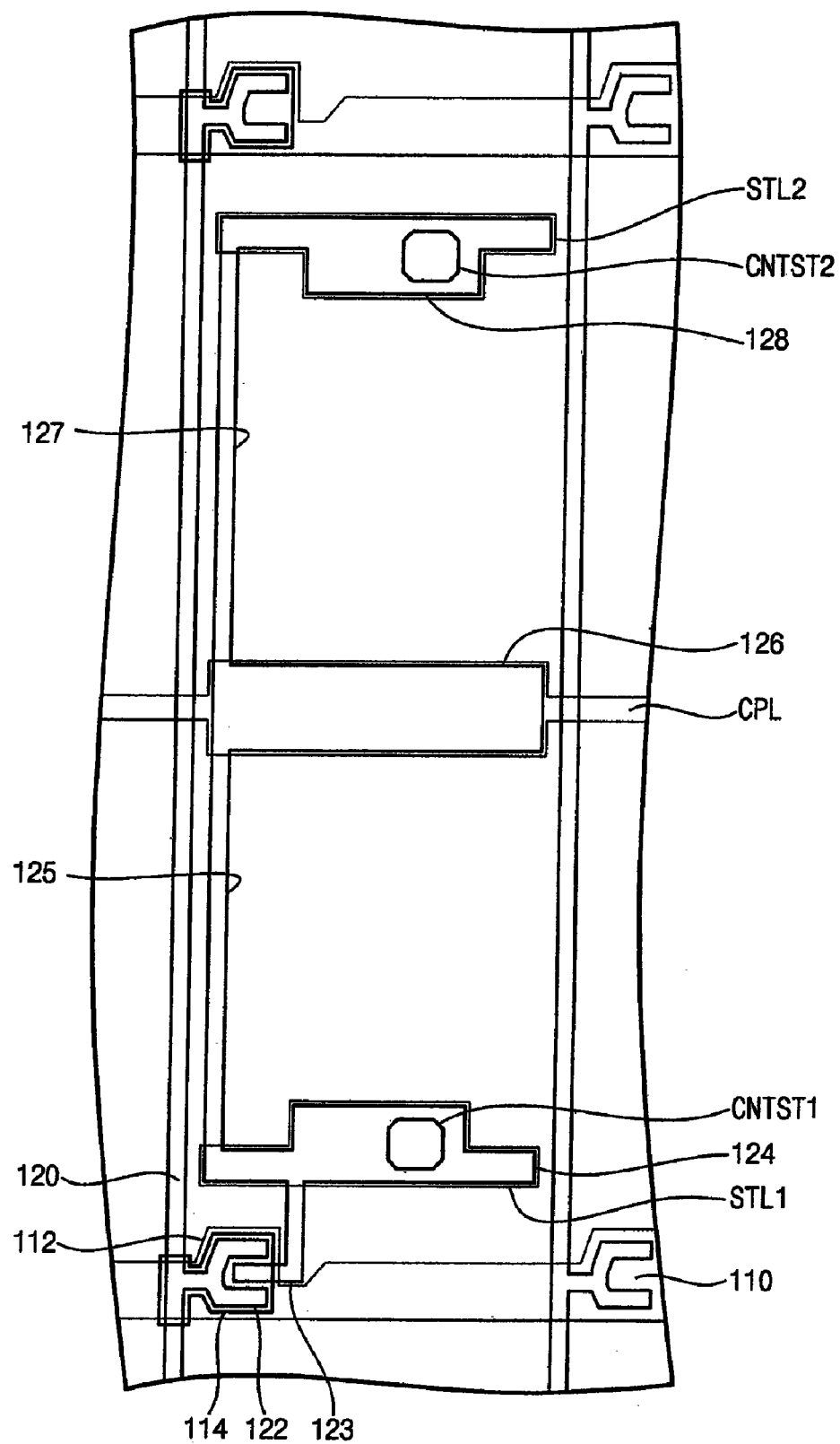
Figure 7:
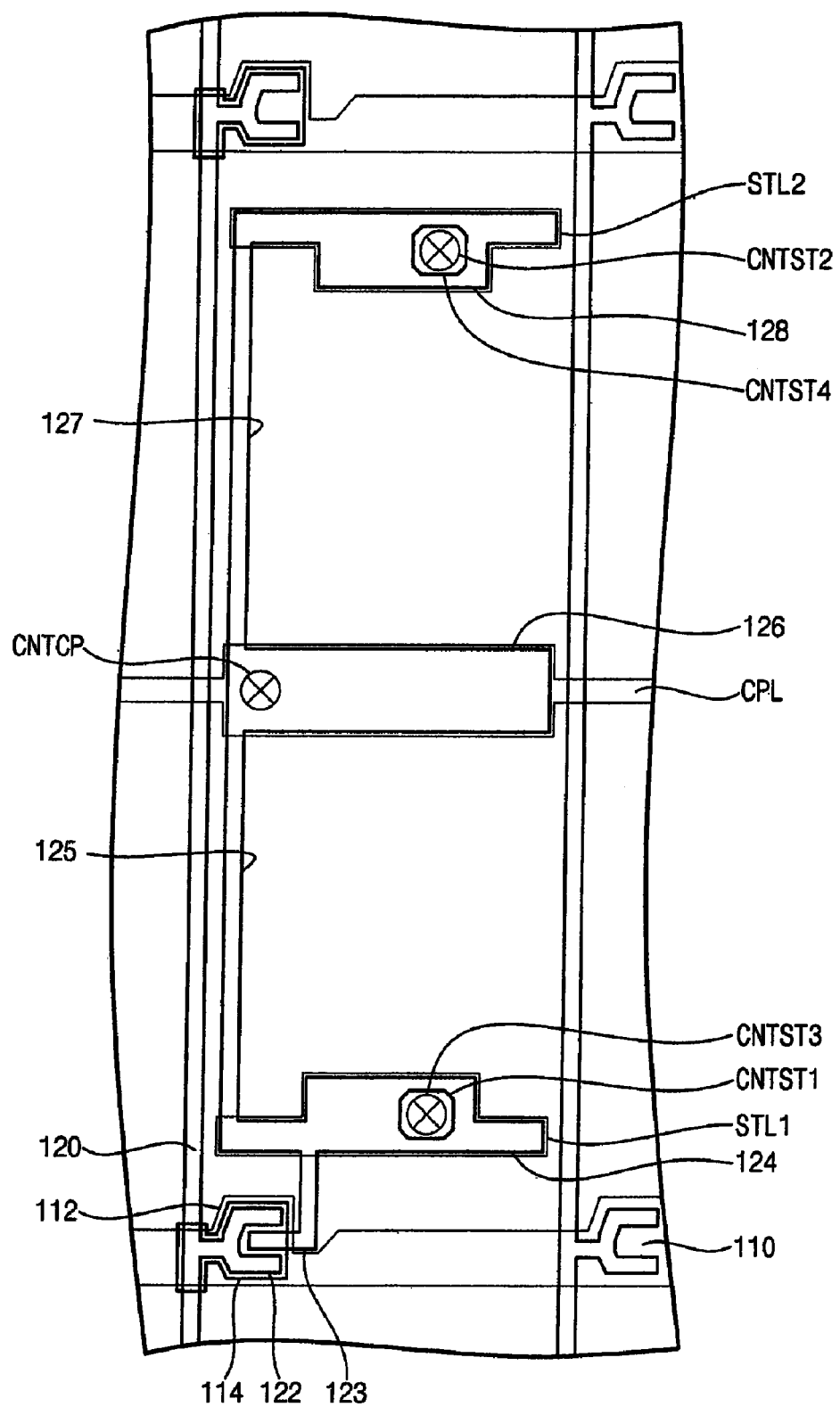
Figure 8:
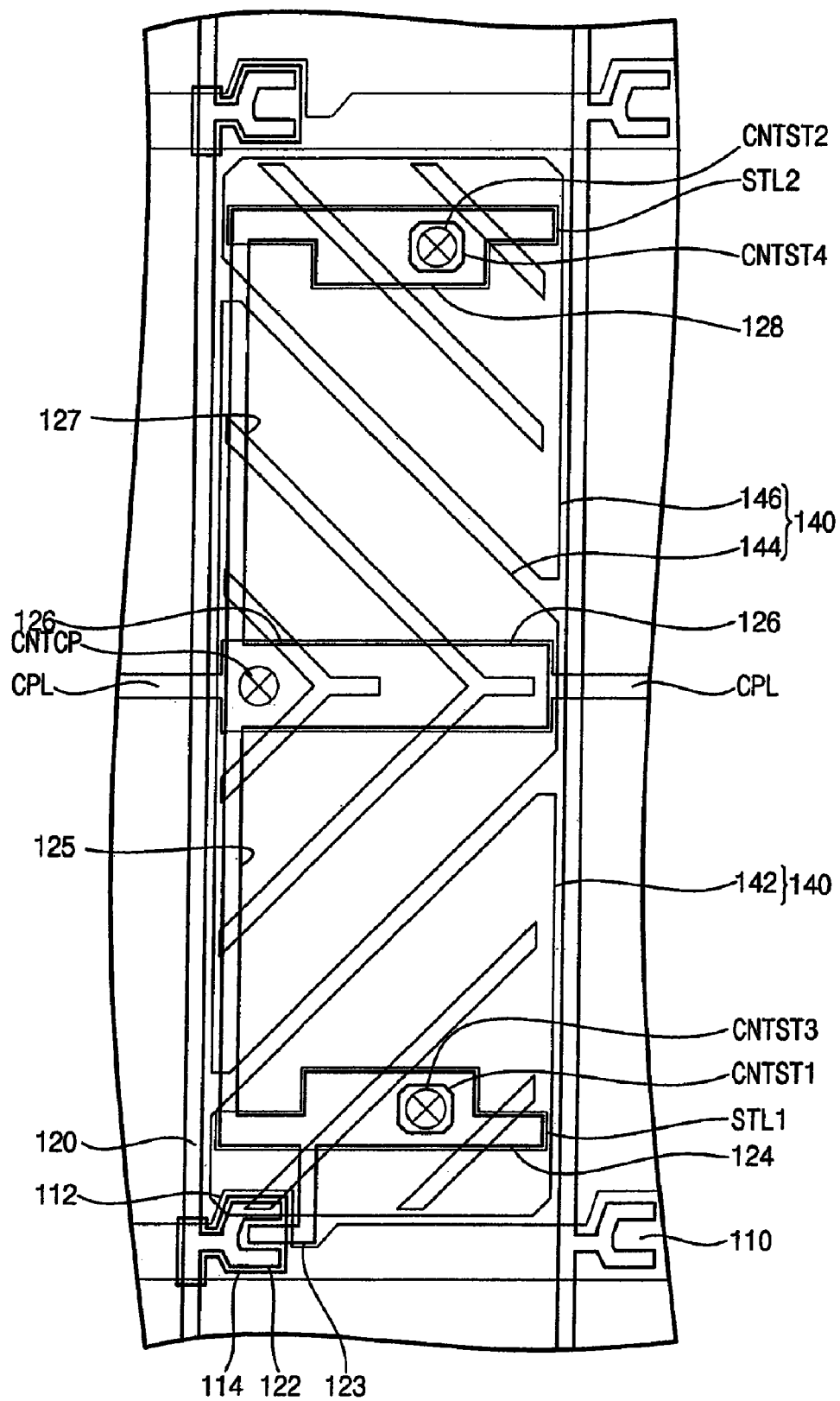

FIGS. 4 to 8 are plan views showing a method of manufacturing the array substrate shown in FIG. 3. The array substrate has contact holes that are adjacent to the drain line adjacent to the TFT and the drain line spaced apart from the TFT, respectively. In particular, FIG. 4 is a plan view showing the gate line. FIG. 5 is a plan view showing the active layer. FIG. 6 is a plan view showing the source-drain lines. FIG. 7 is a plan view showing the organic insulating layer. FIG. 8 is a plan view showing the pixel electrode member.

Referring to FIGS. 2 and 4, one or more metal materials such as tantalum (Ta), titanium (Ti), molybdenum (Mo), aluminum (Al), chromium (Cr), copper (Cu), tungsten (W), and/or other metal material, is deposited on the insulating substrate 105 comprising a transparent insulating material such as glass, ceramic, etc., thereby forming a metal layer The deposited metal layer is patterned to form the gate lines 110 that extend in the horizontal direction and are arranged in the longitudinal direction, the gate electrodes 112 that are electrically connected to the gate lines 110, the first and second lower storage patterns STL1 and STL2 that are substantially parallel to the gate lines 110 in the pixel region, and the first coupling pattern CPL that divides the pixel region into the two regions.

Silicon nitride is deposited on the insulating substrate 105 having the gate lines 110, the gate electrodes 112, the first and second lower storage patterns STL1 and STL2 and the first coupling pattern CPL, to form the gate insulating layer 113. In this exemplary embodiment, the silicon nitride is deposited on the insulating substrate 105 through a chemical vapor deposition process, and the gate insulating layer 113 is deposited on an entire of the insulating substrate 105. Alternatively, the gate insulating layer 113 is patterned so that the patterned gate insulating layer is only on the gate lines 110, the gate electrodes 112, the first and second lower storage patterns STL1 and STL2 and the first coupling pattern CPL.

Referring to FIG. 5, an amorphous silicon layer and an N+ amorphous silicon layer are formed on the gate insulating layer 113. The amorphous silicon layer and an N+ amorphous silicon layer are patterned to form the active layer 114 on the gate electrode 112.

One or more metals such as tantalum (Ta), titanium (Ti), molybdenum (Mo), aluminum (Al), chromium (Cr), copper (Cu), tungsten (W), and/or other metal material is deposited on the gate insulating layer 113 having the active layer 114, thereby forming a metal layer.

Referring to FIG. 6, the deposited metal layer is patterned to form the data lines 120, the source electrodes 122 that are electrically connected to the data lines 120, the drain electrodes 123 that are spaced apart from the source electrodes 122, respectively, the first upper storage patterns 124 that are electrically connected to the drain electrodes 123, respectively, the first extended patterns 125 that are electrically connected to the drain electrodes 123, respectively, the second coupling patterns 126 that are electrically connected to the first extended patterns 125, respectively, the second extended patterns 127 that are electrically connected to the first extended patterns 125, respectively, and the second storage patterns 128 that are electrically connected to the second extended patterns 127, respectively.

A first contact hole CNTST1 is formed on each of the first upper storage patterns 124. Each of the second coupling patterns 126 covers each of the first coupling patterns CPL and divides the pixel region into the two regions. A second contact hole CNTST2 is formed on each of the second upper storage patterns 128.

Referring to FIG. 2 and FIG. 7, the passivation layer 130 and the organic insulating layer 132 are formed on the gate insulating layer 113 having the active layer 114, the data lines 120, the source electrodes 122, the drain electrodes 123, the first upper storage patterns 124, the first extended patterns 125, the second coupling patterns 126, the second extended patterns 127 and the second storage patterns 128. In this exemplary embodiment, the drain line includes the first upper storage patterns 124, the first extended patterns 125, the second coupling patterns 126, the second extended patterns 127 and the second storage patterns 128.

A portion of the passivation layer 130 and the organic insulating layer 132 in the pixel region is partially removed to form a third contact hole CNTST3 corresponding to the first contact hole CNTST1, a fourth contact hole CNTST4 corresponding to the second contact hole CNTST2, and a fifth contact hole CNTCP corresponding to the second coupling pattern 126. Pixel regions of the array substrate are defined as regions bounded by consecutive gate lines 110 and data lines 120.

Referring to FIGS. 2 and 8, the pixel electrode member 140 is formed on the organic insulating layer 132. The pixel electrode member 140 is electrically connected to each of the first lower storage patterns STL1 through the first and third contact holes CNTST1 and CNTST3, and electrically connected to the second lower storage pattern STL2 through the second and fourth contact holes CNTST2 and CNTST4. In addition, the pixel electrode member 140 is electrically connected to the second coupling pattern 126 through the fifth contact hole CNTCP.

In particular, the pixel electrode member 140 may include the main electrode 144 that is electrically connected to the second coupling pattern 126, the first sub-electrode 142 that is electrically connected to the first lower storage pattern STL1, and the second sub-electrode 146 that is electrically connected to the second lower storage pattern STL2 and spaced apart from the first lower storage pattern STL1.

The main electrode 144 has two Y-shaped opening patterns that are symmetrical with respect to a central line of the pixel region in the horizontal direction of the pixel region. A central portion of each of the Y-shaped opening patterns has two adjacent rods that form an interior angle of about 90°. The first sub-electrode 142 has two linear opening patterns that are substantially in parallel with one of the two adjacent rods of each of the Y-shaped opening patterns. The second sub-electrode 146 has two linear opening patterns that are substantially in parallel with another of the two adjacent rods of each of the Y-shaped opening patterns. The linear opening patterns of the first sub-electrode 142 are symmetrical to the linear opening patterns of the second sub-electrode 146 with respect to the central line. In operation, a plurality of domains is formed adjacent to the opening patterns of the pixel electrode member 140 of the array substrate in the liquid crystal layer 180 between the array substrate and the color filter substrate.

The main electrode 144 and the first and second sub-electrodes 142 and 146 include one or more transparent conductive materials such as indium tin oxide (ITO), amorphous indium tin oxide (a-ITO), indium zinc oxide (IZO), zinc oxide (ZO), and/or other transparent conductive material. The transparent conductive material may be coated on the organic insulating layer 132, and patterned to form the main electrode 144 and the first and second sub-electrodes 142 and 146. Alternatively, the main electrode 144 and the first and second sub-electrodes 142 and 146 may be formed through different processes from each other.

In this exemplary embodiment, the main electrode 144 and the first and second sub-electrodes 142 and 146 are spaced apart from one another. Alternatively, the main electrode 144 may be partially overlapped with the first and second sub-electrodes 142 and 146.

According to this exemplary embodiment, the main pixel portion is on a central portion of the pixel region, and the sub-pixel portion is on a peripheral portion of the pixel region. The sub-pixel portion is electrically connected to the thin film transistor through the coupling capacitor. Therefore, a kickback voltage of the main pixel portion is decreased.

Figure 9:
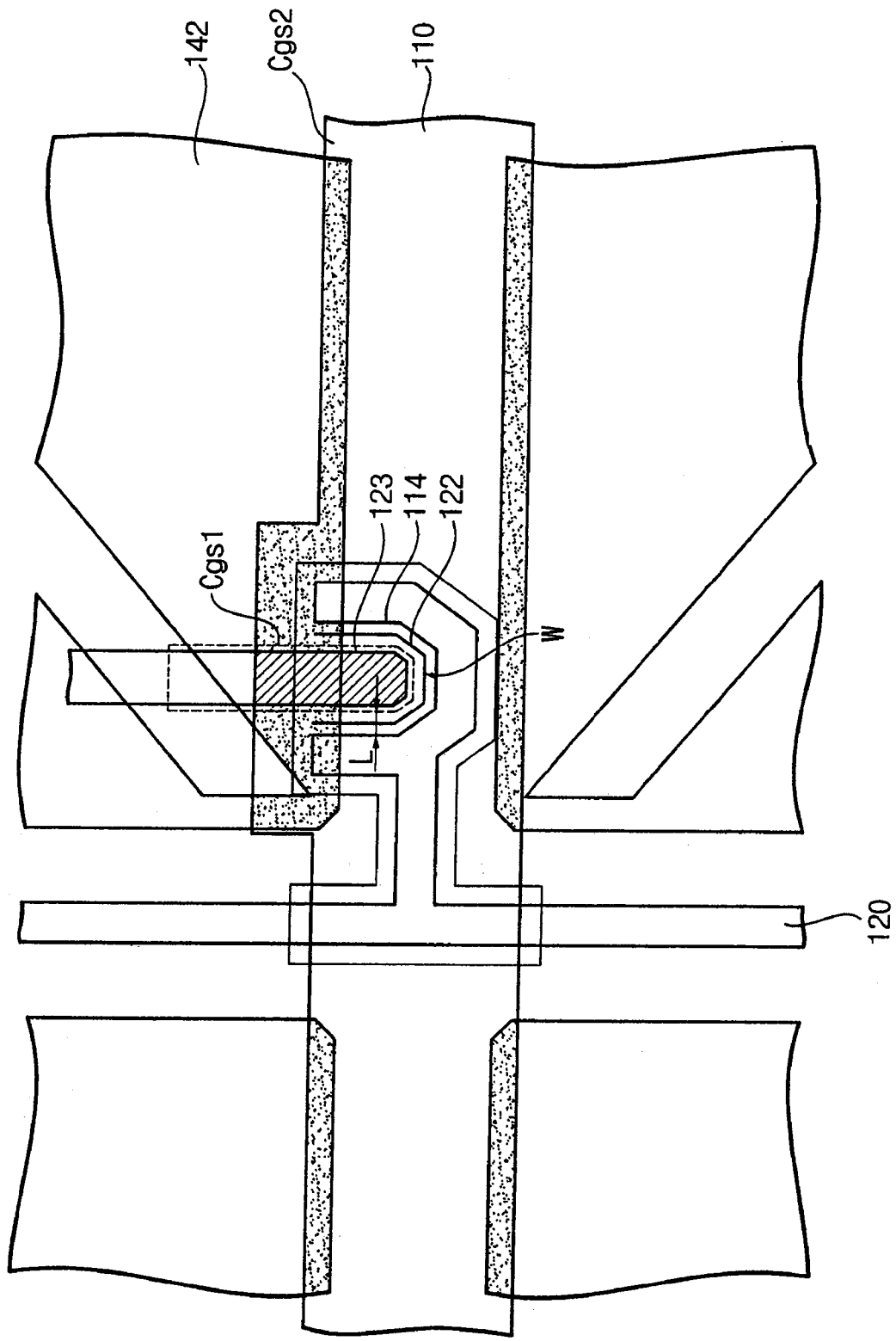
FIG. 9 is a plan view showing a gate-source capacitor in accordance with an exemplary embodiment of the present invention.

FIG. 9 is a plan view showing a gate-source capacitor in accordance with an exemplary embodiment of the present invention.

Referring to FIG. 9, a gate-source capacitor Cgs1 is defined by an overlapping of a gate line 110 and a drain line 120 on an active layer. In this exemplary embodiment, an additional gate-source capacitor Cgs2 is defined by an overlapping of the gate line 110 and a pixel electrode 142.

A total gate-source capacitance is divided into a gate-source capacitance of the gate-source capacitor Cgs1 and an additional gate-source capacitance of the additional gate-source capacitor Cgs2. The additional gate-source capacitance of the additional gate-source capacitor Cgs2 corresponds to the sub-pixel portion, so that a kickback voltage of the main pixel portion is decreased, according to Equation 1 below. In this exemplary embodiment, an area ratio of the gate-source capacitor Cgs1 to the additional gate-source capacitor Cgs2 is about 60:40.

The following Equation 1 represents the kickback voltage Vk.

$$Vk = Cgs \cdot (Von - Voff)/(Cgs + Cst + Clc) \quad \text{Equation 1}$$

Cgs, Cst, Clc, Von and Voff represent the gate-source capacitance, a storage capacitance, a liquid crystal capacitance, a gate on voltage and a gate off voltage, respectively.

By reducing the kickback voltage, some display defects may be reduced or eliminated. For example, a malfunction caused by a root-mean square (RMS) of a pixel voltage, for example, a flicker, is decreased.

Additionally, the sub-pixel portion displays black between a zero gray-scale and a middle gray-scale, thereby decreasing an afterimage of a low gray-scale.

Figure 10:
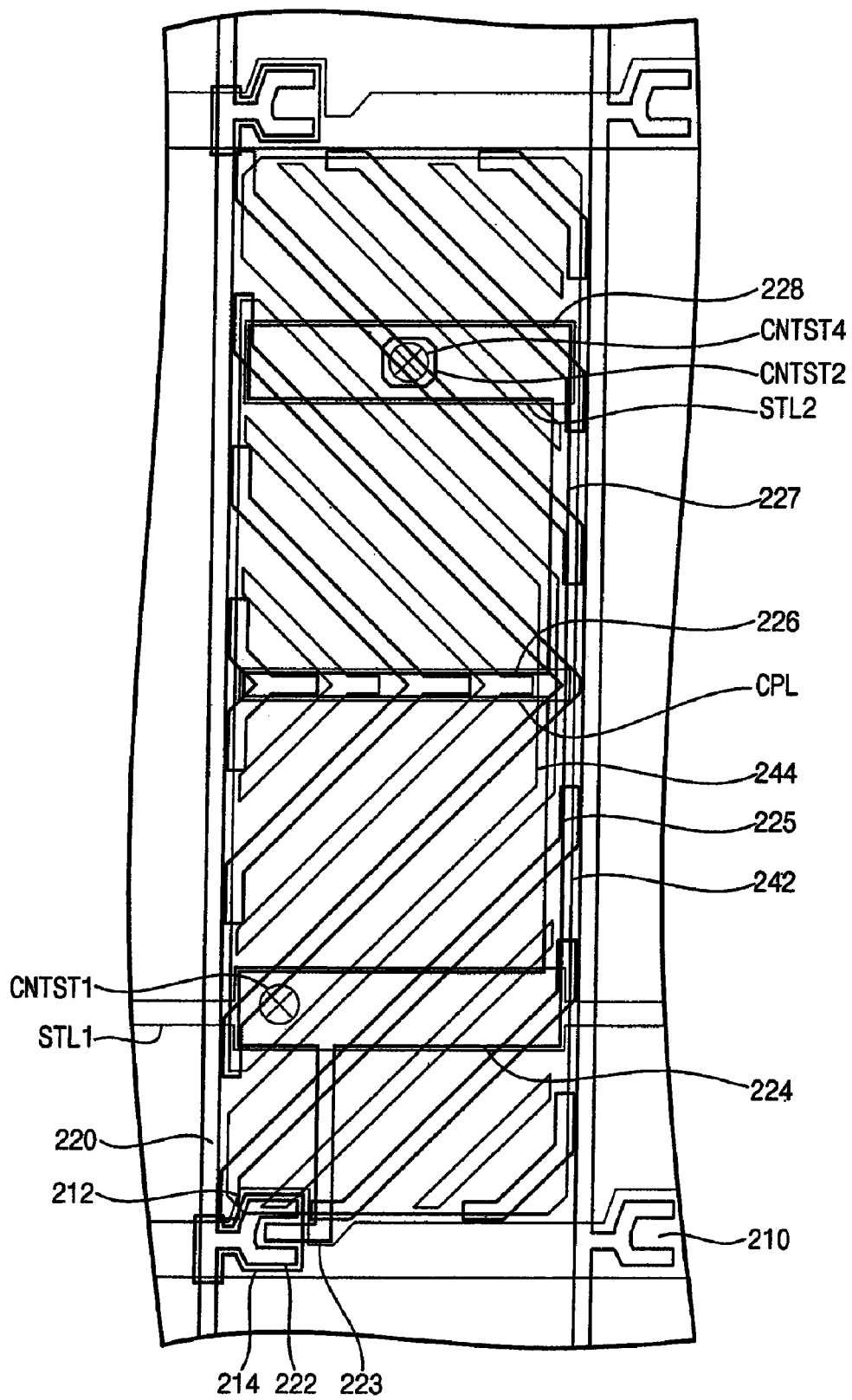
FIG. 10 is a plan view showing an LCD panel in accordance with another exemplary embodiment of the present invention.
Figure 11:
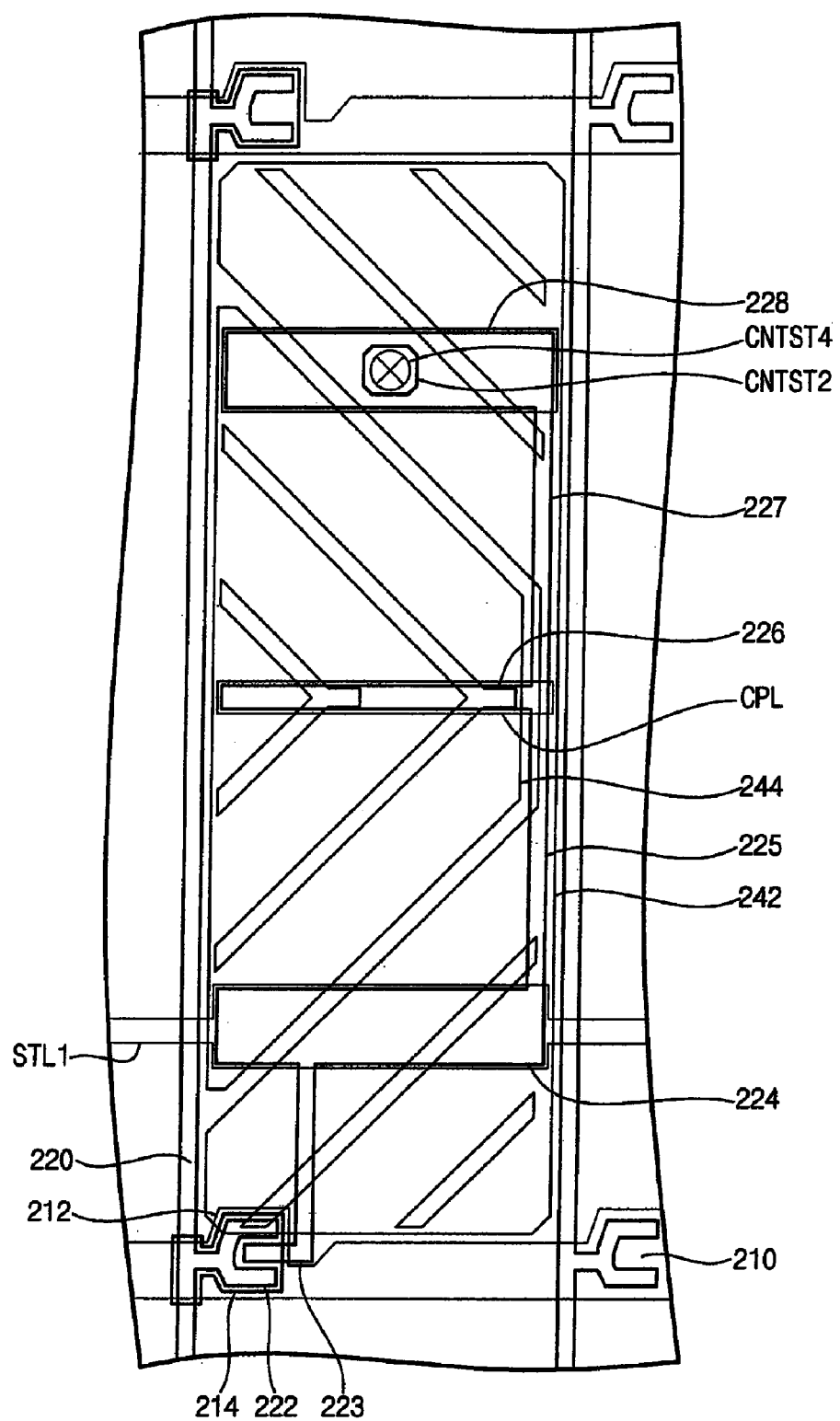
FIG. 11 is a plan view showing an array substrate shown in FIG. 10.

FIG. 10 is a plan view showing an LCD panel in accordance with another exemplary embodiment of the present invention. FIG. 11 is a plan view showing an array substrate shown in FIG. 10. The array substrate has a contact hole on a layer where a drain electrode is formed adjacent to a thin film transistor (TFT).

Referring to FIGS. 2, 10 and 11, the array substrate 200 may include a gate line 210 that extends in a horizontal direction, a gate electrode 212 that is electrically connected to the gate line 210, first and second lower storage patterns STL1 and STL2 that are spaced apart from the gate line 210 in a pixel region and substantially parallel to the gate line 210, and a first coupling pattern CPL that divides the pixel region into two regions. In some embodiments, the array substrate 200 may include a plurality of gate lines 210, a plurality of gate electrodes 212, a plurality of pixel regions and a plurality of first coupling patterns CPL, where pixel regions are defined by consecutive gate lines 210 and data lines 220.

The array substrate 200 may include an insulating substrate (not shown) comprising silicon nitride, silicon oxide, and/or other insulating material. The array substrate 200 may further include a gate insulating layer (not shown) and an active layer 214. The gate insulating layer (not shown) is on the insulating substrate (not shown) having the gate line 210 and the gate electrode 212. The active layer 214 is on the gate insulating layer (not shown) corresponding to the gate electrode 212. The active layer 214 comprises a semiconductor layer having amorphous silicon, polysilicon, and/or other semiconductor material, and an impurity-doped (e.g., implanted) semiconductor layer comprising N+ amorphous silicon, N+ polysilicon, and/or other doped material.

The array substrate 200 may include a source line 220 that extends in a longitudinal direction, a source electrode 222 that is electrically connected to the source line 220 and a drain electrode 223 that is spaced apart from the source electrode 222. In some embodiments, the array substrate 200 may include a plurality of source lines 220, a plurality of source electrodes 222 and a plurality of drain electrodes 223. Each of the gate electrodes 212, each of the semiconductor layers, each of the impurity implanted semiconductor layers, each of the source electrodes 222 and each of the drain electrodes 223 form an associated thin film transistor (TFT).

The array substrate 200 may further include a first upper storage pattern 224 that is electrically connected to the drain electrode 223, a first extended pattern 225 that is electrically connected to the drain electrode 223 on a left side of the pixel region, a second coupling pattern 226 that is electrically connected to the first extended pattern 225, a second extended pattern 227 that is electrically connected to the first extended pattern 225 on the left side of the pixel region, and a second upper storage pattern 228 that is electrically connected to the second extended pattern 227. In this exemplary embodiment, the first upper storage patterns 224, the first extended patterns 225, the second coupling patterns 226, the second extended patterns 227 and the second storage patterns 228 form a drain line.

The array substrate 200 may further include a passivation layer 230 and an organic insulating layer 232. The passivation layer 230 covers the TFT. The passivation layer 230 and the organic insulating layer 232 have a contact hole through which the drain electrode 223 is partially exposed. The passivation layer 230 and the organic insulating layer 232 protect the active layer 214 between the source electrode 222 and the drain electrode 223. The TFT is electrically insulated from a pixel electrode member by the passivation layer 230 and the organic insulating layer 232. The active layer 214 may include the semiconductor layer and the impurity implanted semiconductor layer.

A height of the organic insulating layer 232 may be controlled so that a thickness of the liquid crystal layer 200 is controlled. In some embodiments, the passivation layer 230 may be omitted.

The array substrate 200 may further include the pixel electrode member that is electrically connected to the second coupling pattern 224 through the contact hole CNTST1. The pixel electrode member has opening patterns.

In particular, the pixel electrode member may include a main electrode 244 and a sub-electrode 242. The main electrode 244 has a wedge shape that is protruded toward a right side of the pixel region. The sub-electrode 242 is on a remaining portion of the pixel region where the main electrode 244 is not formed.

In the illustrated embodiment, the main electrode 244 has two Y-shaped opening patterns that are symmetrical with respect to a central line of the pixel region in the horizontal direction of the pixel region. A central portion of each of the Y-shaped opening patterns has two adjacent rods that form an interior angle of about 90°. The sub-electrode 242 is divided into a plurality of portions. In the illustrated embodiment, each of the portions of the sub-electrode 242 has a substantially constant width.

The sub-electrode 242 has four linear opening patterns. Two of the linear opening patterns are substantially parallel to an upper one of the two adjacent rods of each of the Y-shaped opening patterns. The remaining two of the linear opening patterns are substantially parallel to a lower one of the two adjacent rods of each of the Y-shaped opening patterns. The two linear opening patterns that are substantially parallel to the upper one of the two adjacent rods of each of the Y-shaped opening patterns are symmetrical to the remaining two linear opening patterns that are substantially parallel to the lower one of the two adjacent rods of each of the Y-shaped opening patterns with respect to the central line.

In operation of an LCD device including array substrate 200, a plurality of domains is formed adjacent to the opening patterns of the pixel electrode member in the liquid crystal layer positioned between array substrate 200 and a color filter substrate.

The main electrode 244 and the sub-electrode 242 comprise one or more transparent conductive materials, such as indium tin oxide (ITO), amorphous indium tin oxide (a-ITO), indium zinc oxide (IZO), zinc oxide (ZO), and/or other transparent conductive material(s).

According to this exemplary embodiment, a total gate-source capacitance is divided into a gate-source capacitance of the gate-source capacitor and an additional gate-source capacitance of the additional gate-source capacitor. The additional gate-source capacitance of the additional gate-source capacitor corresponds to the sub-electrode 242, so that a kickback voltage of the main electrode 244 is decreased. Therefore, an image display quality of the LCD device is improved.

In addition, the number of the contact holes on an organic insulating layer is only two, which may improve the reliability of the LCD device, as described below.

In the exemplary embodiment discussed herein, one contact hole is formed between a layer where the gate line 210 is formed and a layer where the source line 220 is formed, and another contact hole is formed between a layer where the pixel electrode member is formed and the layer where the source line 220 is formed. Other configurations of LCD devices have three contact holes: one contact hole between a layer where a gate line is formed and a layer where a source line is formed, and another two contact holes between a layer where the pixel electrode member is formed and the layer where the source line is formed. Since each contact hole increases the probability that a short circuit may be formed, the illustrated embodiment reduces the probability of a short circuit between the layer where the gate line 210 is formed and the layer where the source line 220 is formed. A short circuit between the layer where the gate line 210 is formed and the layer where the source line 220 is formed may cause a malfunction of the LCD device.

In addition, only one sub-electrode is formed in each pixel region in the illustrated embodiment. That is, the number of the sub-electrodes is decreased so that the array substrate 200 may be easily tested. This may decrease a manufacturing time of the LCD device.

Figure 12:
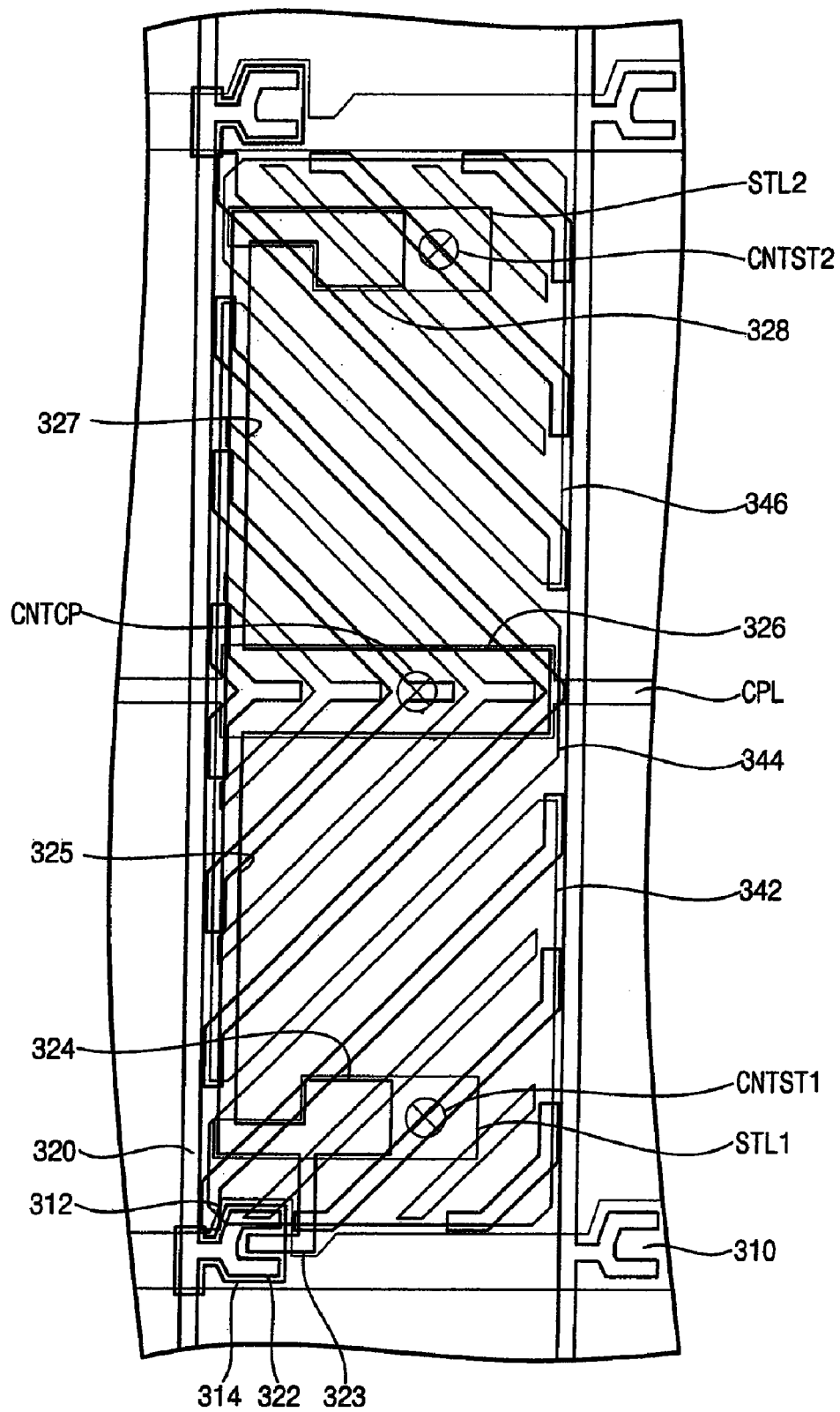
FIG. 12 is a plan view showing an LCD panel in accordance with another exemplary embodiment of the present invention.
Figure 13:
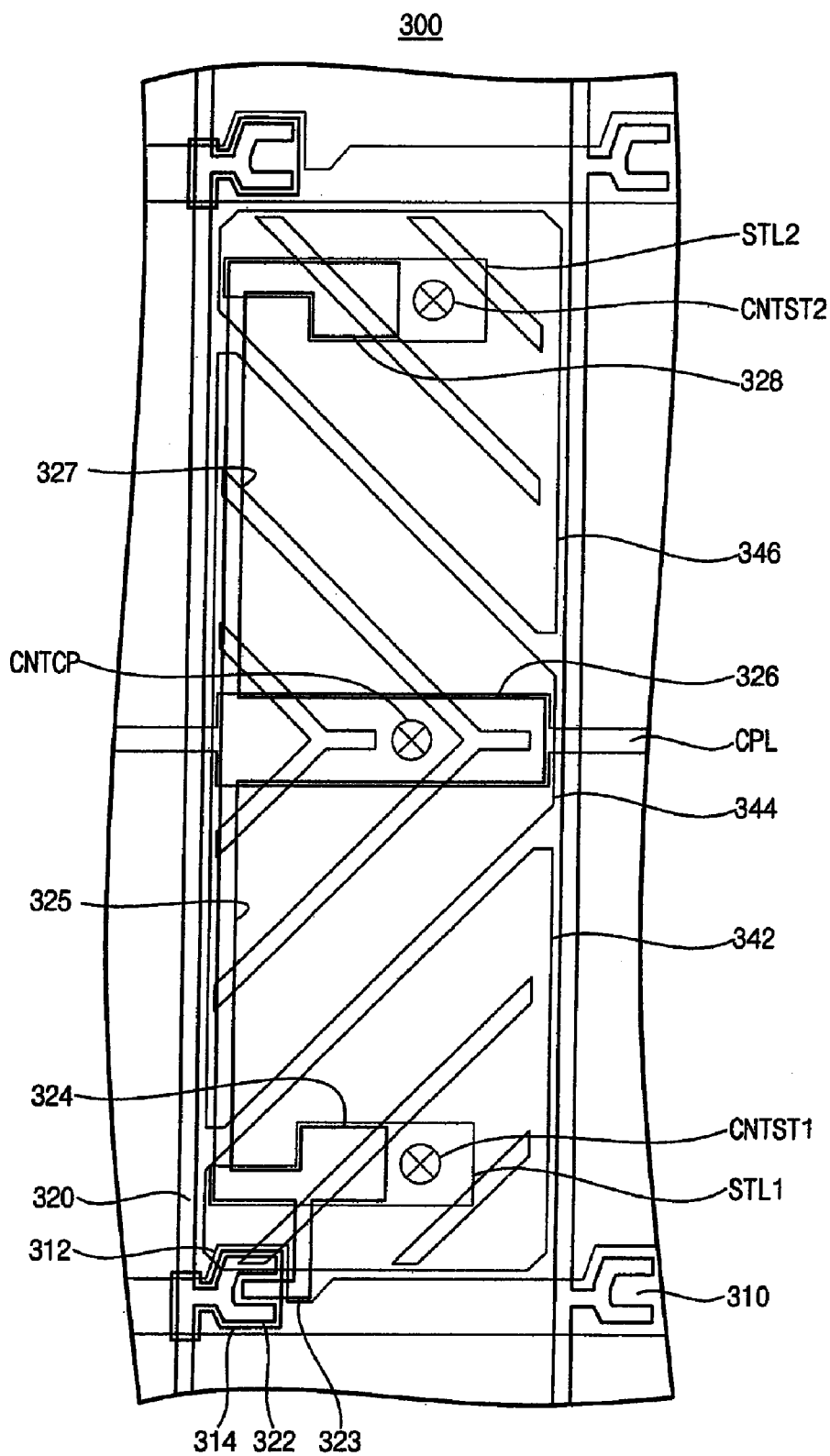
FIG. 13 is a plan view showing an array substrate shown in FIG. 12.

FIG. 12 is a plan view showing an LCD panel in accordance with another exemplary embodiment of the present invention. FIG. 13 is a plan view showing an array substrate shown in FIG. 12. Contact holes are formed on a storage line adjacent to a TFT and on the storage line spaced apart from the TFT. A central portion of the storage line has a greater width than a remaining portion of the storage line.

Referring to FIGS. 12 and 13, the array substrate 300 may include a gate line 310 that extends in a horizontal direction, a gate electrode 312 that is electrically connected to the gate line 310, first and second lower storage patterns STL1 and STL2 that are spaced apart from the gate line 310 in a pixel region and substantially parallel to the gate line 310, and a first coupling pattern CPL that divides the pixel region into two regions. In some embodiments, the array substrate 300 may include a plurality of gate lines 310, a plurality of gate electrodes 312, a plurality of pixel regions and a plurality of first coupling patterns CPL, where pixel regions are defined by consecutive gate lines 310 and data lines 320.

The array substrate 300 may include an insulating substrate (not shown) comprising silicon nitride, silicon oxide, and/or other insulating material. The array substrate 300 may further include a gate insulating layer (not shown) and an active layer 314. The gate insulating layer (not shown) is on the insulating substrate (not shown) having the gate line 310 and the gate electrode 312. The active layer 314 is on the gate insulating layer (not shown) corresponding to the gate electrode 312. The active layer 314 has a semiconductor layer comprising amorphous silicon, polysilicon, and/or other semiconductor material, and an impurity-doped (e.g., implanted) semiconductor layer comprising N+ amorphous silicon, N+ polysilicon, and/or other doped material.

The array substrate 300 may include a source line 320 that extends in a longitudinal direction, a source electrode 322 that is electrically connected to the source line 320 and a drain electrode 323 that is spaced apart from the source electrode 322. In some embodiments, the array substrate 300 may include a plurality of source lines 320, a plurality of source electrodes 322 and a plurality of drain electrodes 323. Each of the gate electrodes 312, each of the semiconductor layers, each of the impurity implanted semiconductor layers, each of the source electrodes 322 and each of the drain electrodes 323 form an associated thin film transistor (TFT).

The array substrate 300 may further include a first upper storage pattern 324 that is electrically connected to the drain electrode 323 and has an opening through which the lower storage pattern STL1 is partially exposed, a first extended pattern 325 that is electrically connected to the first upper storage pattern 324 on a left side of the pixel region, a second coupling pattern 326 that is electrically connected to the first extended pattern 325, a second extended pattern 327 that is electrically connected to the first extended pattern 325 on the left side of the pixel region, and a second upper storage pattern 328 that is electrically connected to the second extended pattern 327 and has an opening through which the second lower storage pattern STL2 is partially exposed. In this exemplary embodiment, the first upper storage patterns 324, the first extended patterns 325, the second coupling patterns 326, the second extended patterns 327 and the second storage patterns 328 form a drain line.

The array substrate 300 may further include a passivation layer (not shown) and an organic insulating layer (not shown). The passivation layer (not shown) covers the TFT. The passivation layer (not shown) and the organic insulating layer (not shown) have a contact hole through which the drain electrode 323 is partially exposed. The passivation layer (not shown) and the organic insulating layer (not shown) protect the active layer 314 between the source electrode 322 and the drain electrode 323. The TFT is electrically insulated from a pixel electrode member by the passivation layer (not shown) and the organic insulating layer (not shown). The active layer 314 may include the semiconductor layer and the impurity implanted semiconductor layer.

The array substrate 300 may further include the pixel electrode member that is electrically connected to the second coupling pattern 326 through a contact hole CNTCP.

In particular, the pixel electrode member may include a main electrode 344, a first sub-electrode 342 and a second sub-electrode 346. The main electrode 344 is electrically connected to the second coupling pattern 326 through the contact hole CNTCP. The first sub-electrode 342 is electrically connected to the first lower storage pattern STL1. The second sub-electrode 346 is electrically connected to the second lower storage pattern STL2, and spaced apart from the first sub-electrode 342.

In the illustrated embodiment, the main electrode 344 has two Y-shaped opening patterns that are symmetrical with respect to a central line of the pixel region in the horizontal direction of the pixel region. A central portion of each of the Y-shaped opening patterns has two adjacent rods that form an interior angle of about 90°. The first sub-electrode 342 has two linear opening patterns that are substantially parallel to one of the two adjacent rods of each of the Y-shaped opening patterns. The second sub-electrode 346 has two linear opening patterns that are substantially parallel to another of the two adjacent rods of each of the Y-shaped opening patterns. The linear opening patterns of the first sub-electrode 342 are symmetrical to the linear opening patterns of the second sub-electrode 346 with respect to the central line. In operation of an LCD device including array substrate 300, a plurality of domains is formed adjacent to the opening patterns of the pixel electrode member in a liquid crystal layer positioned between array substrate 300 and a color filter substrate.

The main electrode 344 and the first and second sub-electrodes 342 and 346 comprise one or more transparent conductive materials such as indium tin oxide (ITO), amorphous indium tin oxide (a-ITO), indium zinc oxide (IZO), zinc oxide (ZO), and/or other transparent conductive material(s).

The domains are formed by the main electrode 344 and the first and second sub-electrodes 342 and 346, so that a rubbing process of the array substrate and/or a color filter substrate may be omitted. In addition, an alignment layer (not shown) may also be omitted.

According to this exemplary embodiment, a total gate-source capacitance is divided into a gate-source capacitance of the gate-source capacitor and an additional gate-source capacitance of the additional gate-source capacitor. The additional gate-source capacitance of the additional gate-source capacitor corresponds to the first and second sub-electrodes 342 and 346. As a result, a kickback voltage of the main electrode 344 is decreased, and the image display quality of the LCD device is improved.

Figure 14:
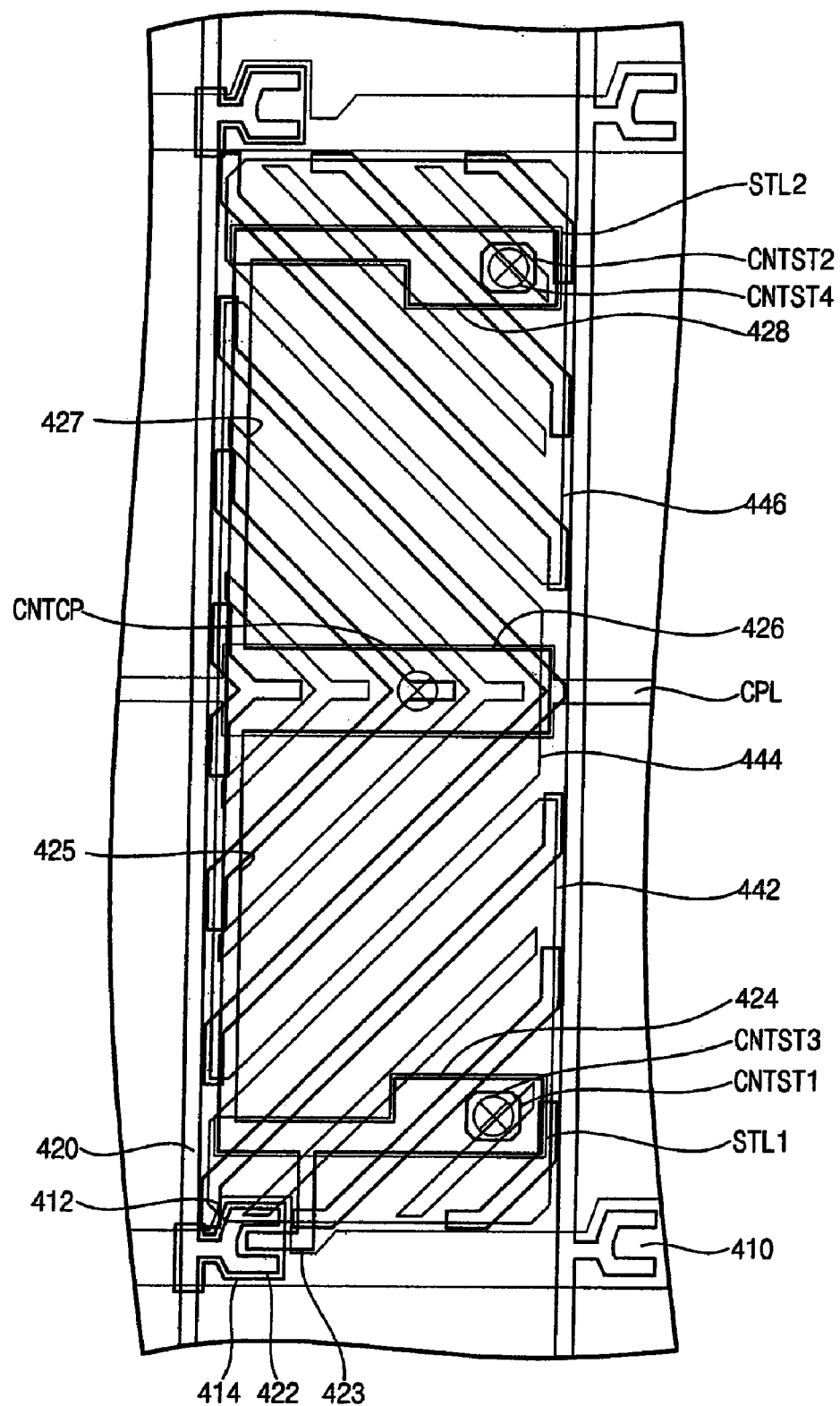
FIG. 14 is a plan view showing an LCD panel in accordance with another exemplary embodiment of the present invention.
Figure 15:
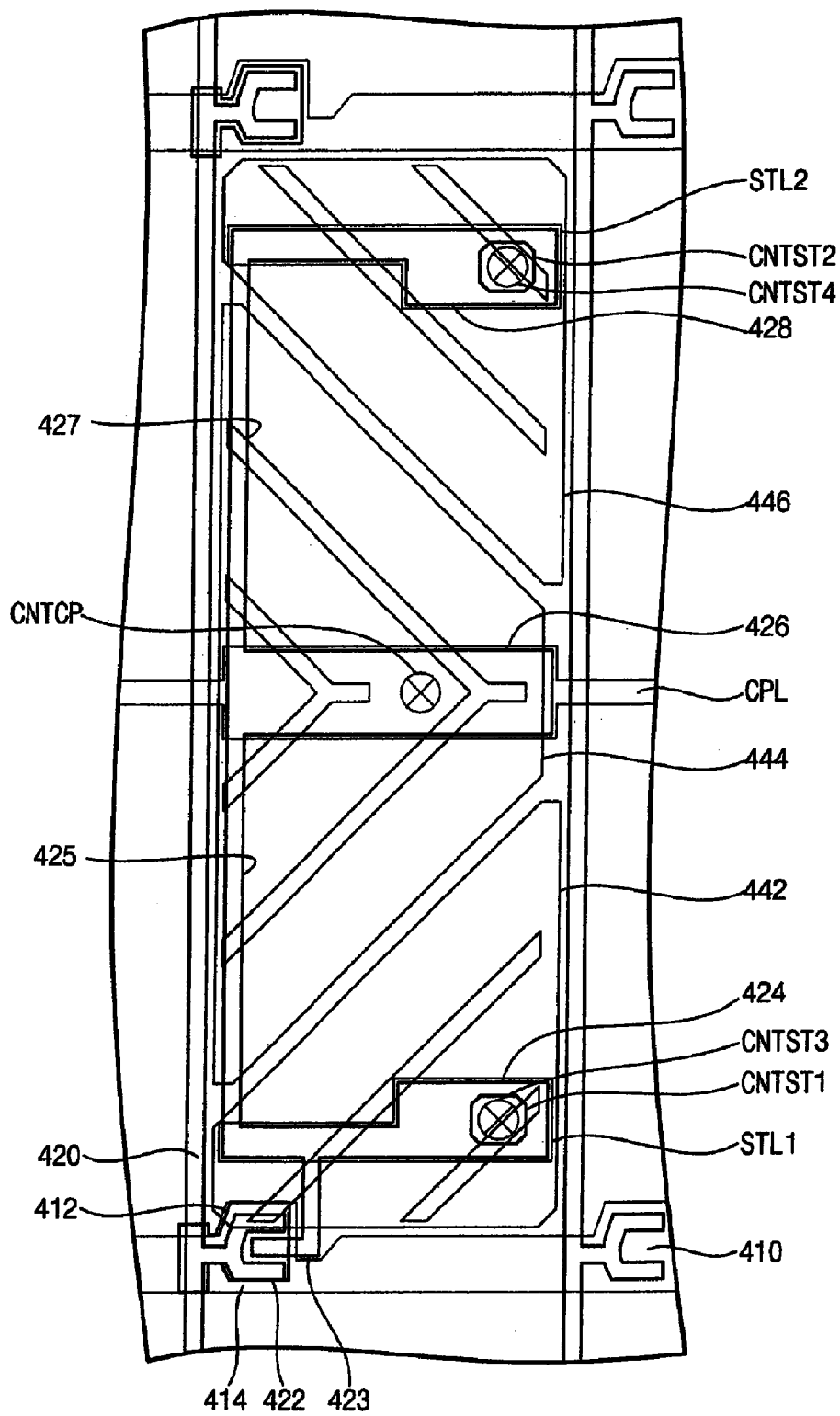
FIG. 15 is a plan view showing an array substrate shown in FIG. 14.

FIG. 14 is a plan view showing an LCD panel in accordance with another exemplary embodiment of the present invention. FIG. 15 is a plan view showing an array substrate shown in FIG. 14. In the illustrated embodiment, contact holes are formed on a drain line adjacent to a TFT, on the drain line spaced apart from the TFT, and on a central portion of a storage line. A portion of the drain line on which the contact holes are formed has a greater width than remaining portion of the drain line. The central portion of the storage line has a greater width than a remaining portion of the storage line.

Referring to FIGS. 14 and 15, the array substrate 400 may include a gate line 410 that extends in a horizontal direction, a gate electrode 412 that is electrically connected to the gate line 410, first and second lower storage patterns STL1 and STL2 that are spaced apart from the gate line 410 in a pixel region and substantially parallel to the gate line 410, and a first coupling pattern CPL that divides the pixel region into two regions. In some embodiments, the array substrate 400 may include a plurality of gate lines 410, a plurality of gate electrodes 412, a plurality of pixel regions and a plurality of first coupling patterns CPL, where pixel regions are defined by consecutive gate lines 410 and data lines 420.

The array substrate 400 may include an insulating substrate (not shown) comprising silicon nitride, silicon oxide, and/or other insulating material. The array substrate 400 may further include a gate insulating layer (not shown) and an active layer 414. The gate insulating layer (not shown) is on the insulating substrate (not shown) having the gate line 410 and the gate electrode 412. The active layer 414 is on the gate insulating layer (not shown) corresponding to the gate electrode 412. The active layer 414 comprises a semiconductor layer having amorphous silicon, polysilicon, and/or other semiconductor material, and an impurity-doped (e.g., implanted) semiconductor layer having N+ amorphous silicon, N+ polysilicon, and/or other doped material.

The array substrate 400 may include a source line 420 that extends in a longitudinal direction, a source electrode 422 that is electrically connected to the source line 420 and a drain electrode 423 that is spaced apart from the source electrode 422. In some embodiments, the array substrate 400 may include a plurality of source lines 420, a plurality of source electrodes 422 and a plurality of drain electrodes 423. Each of the gate electrodes 412, each of the semiconductor layers, each of the impurity implanted semiconductor layers, each of the source electrodes 422 and each of the drain electrodes 423 form an associated thin film transistor (TFT).

The array substrate 300 may further include a first upper storage pattern 424, a first extended pattern 425, a second coupling pattern 426, a second extended pattern 427 and a second storage pattern 428. In this exemplary embodiment, the first upper storage patterns 424, the first extended patterns 425, the second coupling patterns 426, the second extended patterns 427 and the second storage patterns 428 form a drain line. In some embodiments, the array substrate 300 may further include a plurality of first upper storage patterns 424, a plurality of first extended patterns 425, a plurality of second coupling patterns 426, a plurality of second extended patterns 427 and a plurality of second storage patterns 428.

The first upper storage pattern 424 is electrically connected to the drain electrode 423, and the first upper storage pattern 424 is on the first lower storage pattern STL1. The first extended pattern 425 is electrically connected to the first upper storage pattern 424 on a left side of the pixel region. Alternatively, the first extended pattern 425 may be on a central portion of the pixel region. Alternatively, the second coupling pattern 426 is electrically connected to the first extended pattern 425, and covers the first coupling pattern CPL. The second extended pattern 427 is electrically connected to the first extended pattern 425 on the left side of the pixel region. Alternatively, the second extended pattern 427 may be on the central portion of the pixel region. The second upper storage pattern 428 is electrically connected to the second extended pattern 427, and the second upper storage pattern 428 is on the second lower storage pattern STL2.

The array substrate 400 may further include a passivation layer (not shown) and an organic insulating layer (not shown). The passivation layer (not shown) covers the TFT. The passivation layer (not shown) and the organic insulating layer (not shown) have a contact hole through which the drain electrode 423 is partially exposed. The passivation layer (not shown) and the organic insulating layer (not shown) protect the active layer 414 between the source electrode 422 and the drain electrode 423. The TFT is electrically insulated from a pixel electrode member by the passivation layer (not shown) and the organic insulating layer (not shown). The active layer 414 may include the semiconductor layer and the impurity implanted semiconductor layer.

The array substrate 400 may further include the pixel electrode member that is electrically connected to the second coupling pattern 426 through a contact hole CNTCP.

In particular, the pixel electrode member may include a main electrode 444, a first sub-electrode 442 and a second sub-electrode 446. The main electrode 444 is electrically connected to the second coupling pattern 426 through the contact hole CNTCP. The first sub-electrode 442 is electrically connected to the first lower storage pattern STL1. The second sub-electrode 446 is electrically connected to the second lower storage pattern STL2, and spaced apart from the first sub-electrode 442.

In the illustrated embodiment, the main electrode 444 has two Y-shaped opening patterns that are symmetrical with respect to a central line of the pixel region in the horizontal direction of the pixel region. A central portion of each of the Y-shaped opening patterns has two adjacent rods that form an interior angle of about 90°.

The first sub-electrode 442 has two linear opening patterns that are substantially parallel to one of the two adjacent rods of each of the Y-shaped opening patterns.

The second sub-electrode 446 has two linear opening patterns that are substantially parallel to another of the two adjacent rods of each of the Y-shaped opening patterns. The linear opening patterns of the first sub-electrode 442 are symmetrical to the linear opening patterns of the second sub-electrode 446 with respect to the central line. In operation of an LCD device including array substrate 400, a plurality of domains is formed adjacent to the opening patterns of the pixel electrode member in a liquid crystal layer positioned between array substrate 400 and a color filter substrate.

The main electrode 444 and the first and second sub-electrodes 442 and 446 comprise one or more transparent conductive materials such as indium tin oxide (ITO), amorphous indium tin oxide (a-ITO), indium zinc oxide (IZO), zinc oxide (ZO), and/or other transparent conductive material(s).

The domains are formed by the main electrode 444 and the first and second sub-electrodes 442 and 446 so that a rubbing process of the array substrate and/or a color filter substrate may be omitted. In addition, an alignment layer (not shown) may also be omitted.

According to this exemplary embodiment, a total gate-source capacitance is divided into a gate-source capacitance of the gate-source capacitor and an additional gate-source capacitance of the additional gate-source capacitor. The additional gate-source capacitance of the additional gate-source capacitor corresponds to the first and second sub-electrodes 442 and 446. As a result, a kickback voltage of the main electrode 444 is decreased, and the image display quality of the LCD device is improved.

Figure 16:
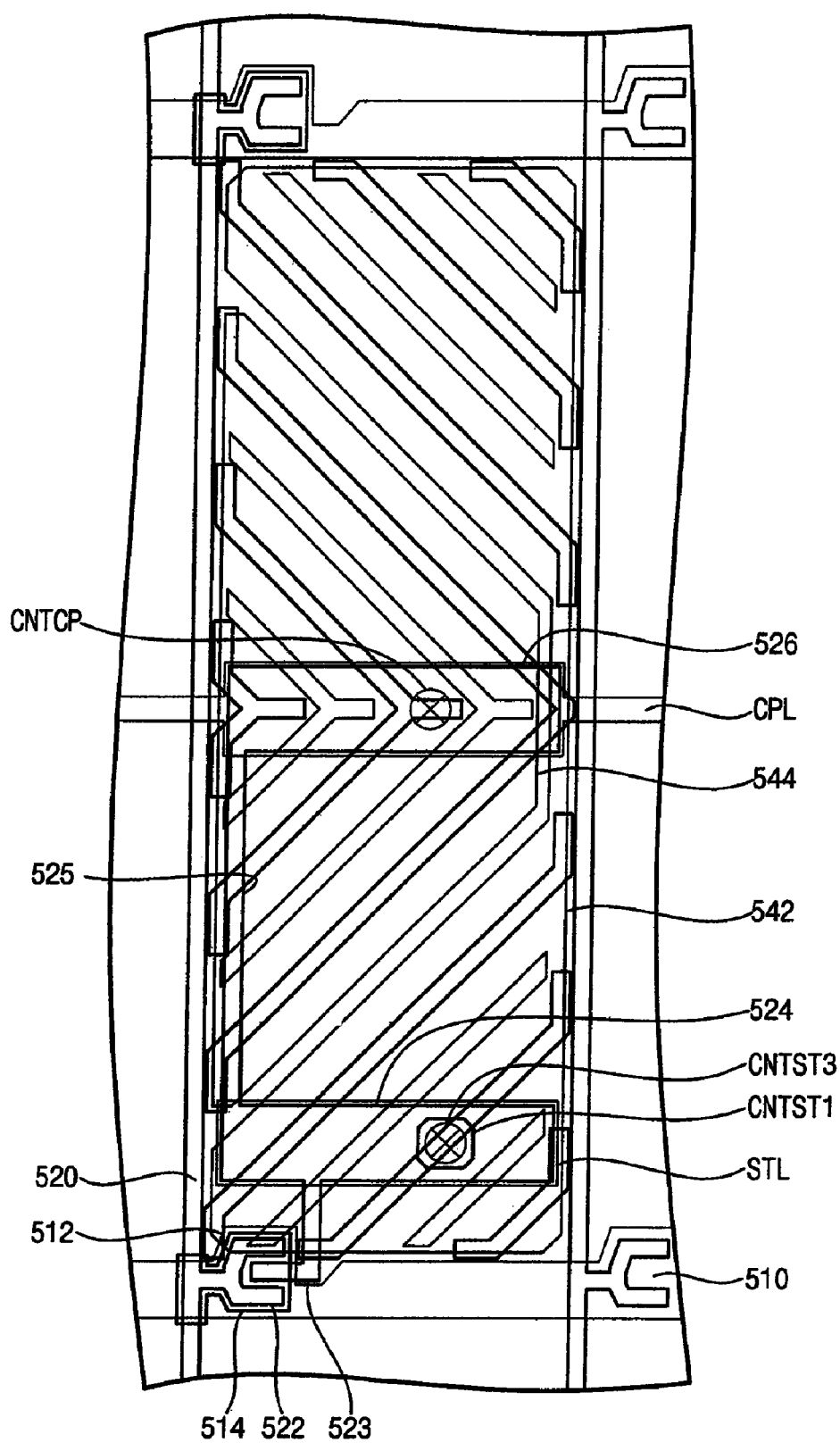
FIG. 16 is a plan view showing an LCD panel in accordance with another exemplary embodiment of the present invention.
Figure 17:
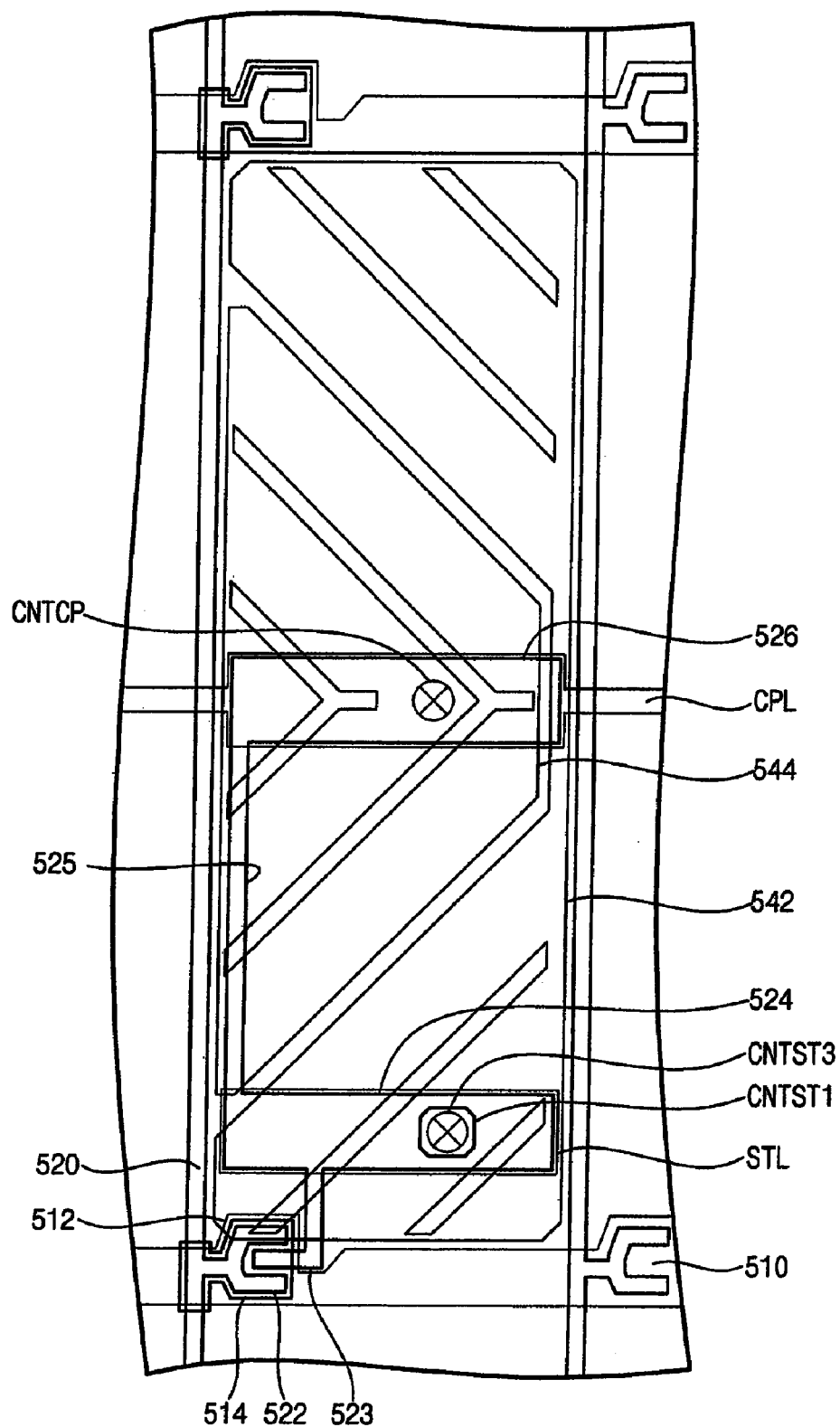
FIG. 17 is a plan view showing an array substrate shown in FIG. 16.

FIG. 16 is a plan view showing an LCD panel in accordance with another exemplary embodiment of the present invention. FIG. 17 is a plan view showing an array substrate shown in FIG. 16. In the illustrated embodiment, a contact hole is formed on a drain line adjacent to a TFT. A central portion of a storage line has a greater width than a remaining portion of the storage line.

Referring to FIGS. 16 and 17, the array substrate 500 may include a gate line 510 that extends in a horizontal direction, a gate electrode 512 that is electrically connected to the gate line 510, a lower storage pattern STL that is substantially parallel to the gate line 510, and a first coupling pattern CPL that divides the pixel region into two regions. In some embodiments, the array substrate 500 may include a plurality of gate lines 510, a plurality of gate electrodes 512, a plurality of pixel regions, a plurality of lower storage patterns STL and a plurality of first coupling patterns CPL, where pixel regions are defined by consecutive gate lines 210 and data lines 220.

The array substrate 500 may include an insulating substrate (not shown) comprising silicon nitride, silicon oxide, and/or other insulating material. The array substrate 500 may further include a gate insulating layer (not shown) and an active layer 514. The gate insulating layer (not shown) is on the insulating substrate (not shown) having the gate line 510 and the gate electrode 512. The active layer 514 is on the gate insulating layer (not shown) corresponding to the gate electrode 512. The active layer 514 comprises a semiconductor layer having amorphous silicon, polysilicon, and/or other semiconductor material, and an impurity-doped (e.g., implanted) semiconductor layer having N+ amorphous silicon, N+ polysilicon, and/or other doped material.

The array substrate 500 may include a source line 520 that extends in a longitudinal direction, a source electrode 522 that is electrically connected to the source line 520 and a drain electrode 523 that is spaced apart from the source electrode 522. In some embodiments, the array substrate 500 may include a plurality of source lines 520, a plurality of source electrodes 522 and a plurality of drain electrodes 523. Each of the gate electrodes 512, each of the semiconductor layers, each of the impurity implanted semiconductor layers, each of the source electrodes 522 and each of the drain electrodes 523 form an associated thin film transistor (TFT).

The array substrate 500 may further include a first upper storage pattern 524 that is electrically connected to the drain electrode 523, a first extended pattern 525 that is electrically connected to the first upper storage pattern 524 on a left side of the pixel region, and a second coupling pattern 526 that is electrically connected to the first extended pattern 525 to cover a first coupling pattern CPL. In some embodiments, the array substrate 500 may further include a plurality of first upper storage patterns 524, a plurality of first extended patterns 525 and a plurality of second coupling patterns 526. In this exemplary embodiment, the first upper storage patterns 524, the first extended patterns 525 and the second coupling patterns 526 form a drain line.

The array substrate 500 may further include a passivation layer (not shown) and an organic insulating layer (not shown). The passivation layer (not shown) and an organic insulating layer (not shown) cover the TFT. The passivation layer (not shown) and the organic insulating layer (not shown) protect the active layer 514 between the source electrode 522 and the drain electrode 523. The TFT is electrically insulated from a pixel electrode member by the passivation layer (not shown) and the organic insulating layer (not shown). The active layer 514 may include the semiconductor layer and the impurity implanted semiconductor layer.

The array substrate 500 may further include the pixel electrode member that is electrically connected to the second coupling pattern 526 through the contact hole CNTCP. The pixel electrode member has opening patterns.

In particular, the pixel electrode member may include a main electrode 544 and a sub-electrode 542. The main electrode 544 has a wedge shape that is protruded toward a right side of the pixel region. The sub-electrode 542 is on a remaining portion of the pixel region where the main electrode 544 is not formed.

In the illustrated embodiment, the main electrode 544 has two Y-shaped opening patterns that are symmetrical with respect to a central line of the pixel region in the horizontal direction of the pixel region. A central portion of each of the Y-shaped opening patterns has two adjacent rods that form an interior angle of about 90°. The sub-electrode 542 is divided into a plurality of portions. Each of the portions of the sub-electrode 542 has a substantially constant width.

The sub-electrode 542 has four linear opening patterns. Two of the linear opening patterns are substantially parallel to an upper one of the two adjacent rods of each of the Y-shaped opening patterns. The remaining two of the linear opening patterns are substantially parallel to the lower one of the two adjacent rods of each of the Y-shaped opening patterns. The two linear opening patterns that are substantially parallel to the upper one of the two adjacent rods of each of the Y-shaped opening patterns are symmetrical to the remaining two linear opening patterns that are substantially parallel to the lower one of the two adjacent rods of each of the Y-shaped opening patterns with respect to the central line.

Alternatively, the sub-electrode 542 may have the wedge shape and the Y-shaped opening patterns, and the main electrode 544 may have the linear opening patterns.

In operation of an LCD device including array substrate 500, a plurality of domains is formed adjacent to the opening patterns of the pixel electrode member in the liquid crystal layer positioned between array substrate 500 and a color filter substrate.

The main electrode 544 and the sub-electrode 542 comprise one or more transparent conductive materials such as indium tin oxide (ITO), amorphous indium tin oxide (a-ITO), indium zinc oxide (IZO), zinc oxide (ZO), and/or other transparent conductive material(s).

The domains are formed by the main electrode 544 and the sub-electrode 542 so that a rubbing process of the array substrate 500 and/or the color filter substrate may be omitted. In addition, an alignment layer (not shown) may also be omitted.

According to this exemplary embodiment, a total gate-source capacitance is divided into a gate-source capacitance of the gate-source capacitor and an additional gate-source capacitance of the additional gate-source capacitor. The additional gate-source capacitance of the additional gate-source capacitor corresponds to the sub-electrode 542. As a result, a kickback voltage of the main electrode 544 is decreased, and the image display quality of the LCD device is improved.

In addition, the number of the contact holes on an organic insulating layer is only two, which may improve the reliability of the LCD device, as described below.

In the exemplary embodiment discussed herein, one contact hole is formed between a layer where the gate line 510 is formed and a layer where the source line 520 is formed, and another contact hole is formed between a layer where the pixel electrode member is formed and the layer where the source line 520 is formed. Other configurations of LCD devices have three contact holes: one contact hole between a layer where a gate line is formed and a layer where a source line is formed, and another two contact holes between a layer where the pixel electrode member is formed and the layer where the source line is formed. Since each contact hole increases the probability that a short circuit may be formed, the illustrated embodiment reduces the probability of a short circuit between the layer where the gate line 510 is formed and the layer where the source line 520 is formed. A short circuit between the layer where the gate line 510 is formed and the layer where the source line 520 is formed may cause a malfunction of the LCD device.

In addition, only one sub-electrode is formed in each pixel region in the illustrated embodiment. That is, the number of sub-electrodes is decreased so that the array substrate 500 may be easily tested. This may decrease a manufacturing time of the LCD device.

Figure 18:
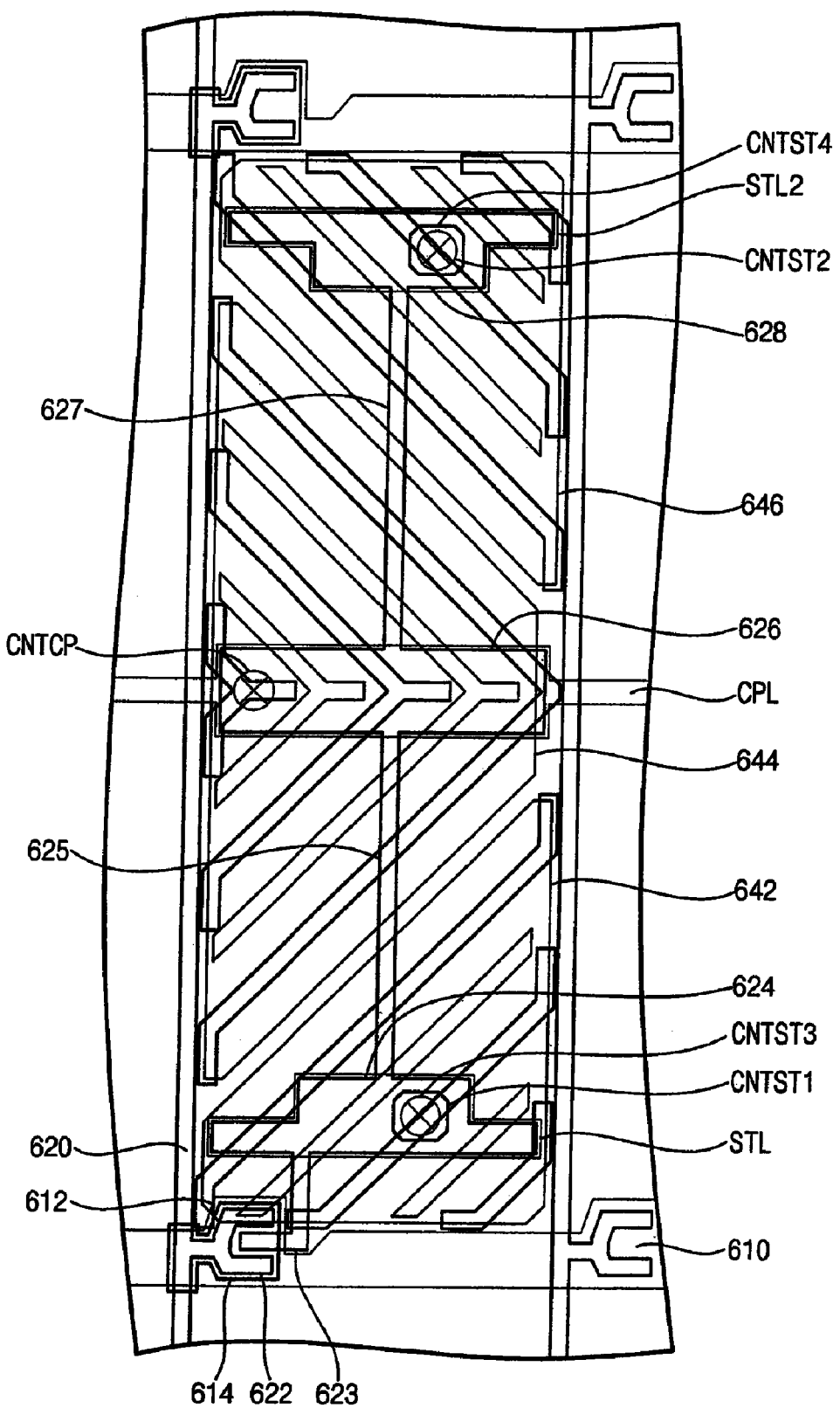
FIG. 18 is a plan view showing an LCD panel in accordance with another exemplary embodiment of the present invention.
Figure 19:
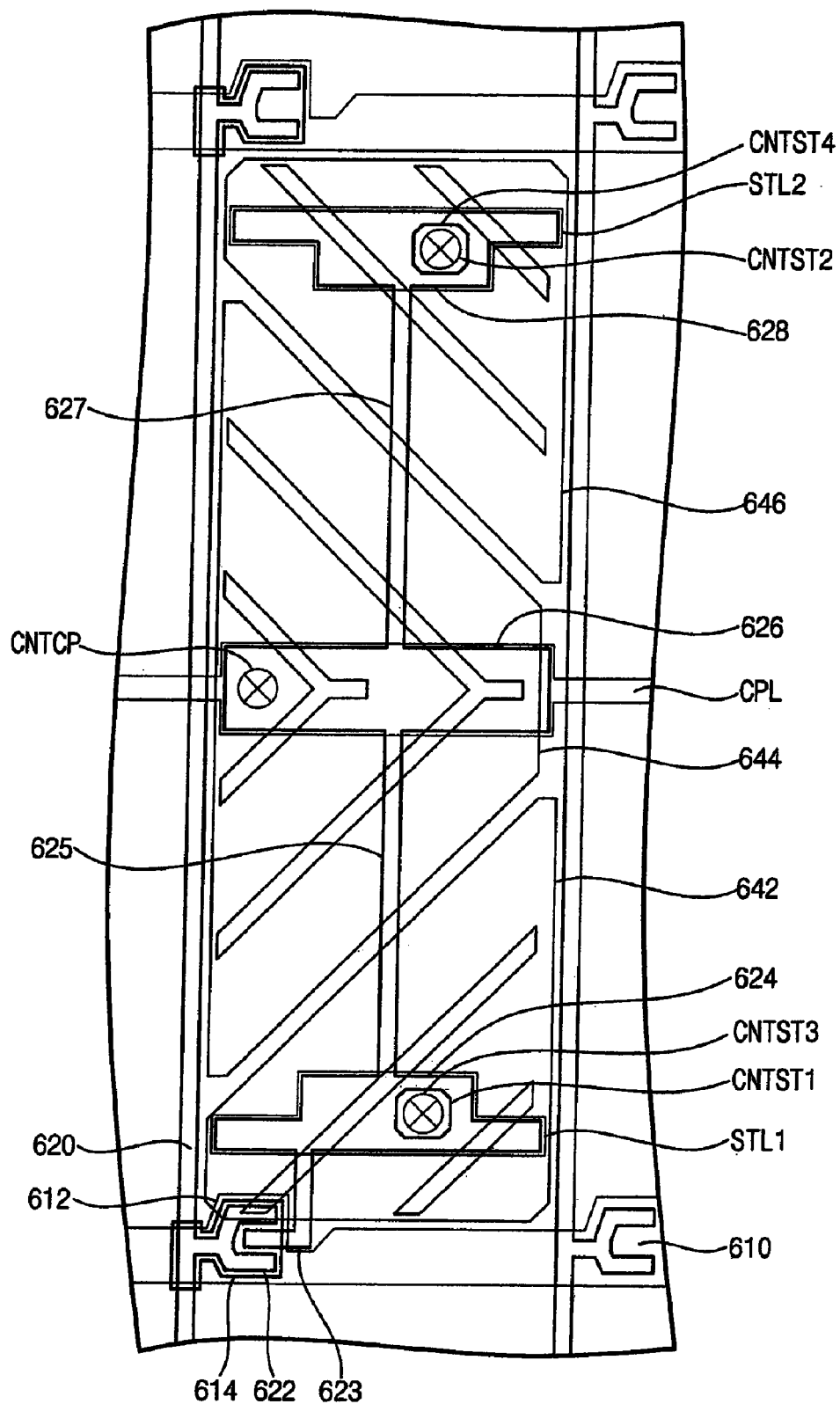
FIG. 19 is a plan view showing an array substrate shown in FIG. 18.

FIG. 18 is a plan view showing an LCD panel in accordance with another exemplary embodiment of the present invention. FIG. 19 is a plan view showing an array substrate shown in FIG. 18. In the illustrated embodiment, contact holes are formed on a drain line adjacent to a TFT, on the drain line spaced apart from the TFT and on a storage line. First and second extended patterns are along a central line of a pixel region in the longitudinal direction of the pixel region.

Referring to FIGS. 18 and 19, the array substrate 600 may include a gate line 610 that extends in a horizontal direction, a gate electrode 612 that is electrically connected to the gate line 610, first and second lower storage patterns STL1 and STL2 that are spaced apart from the gate line 610 in a pixel region and substantially parallel to the gate line 610, and a first coupling pattern CPL that divides the pixel region into two regions. In some embodiments, the array substrate 600 may include a plurality of gate lines 610, a plurality of gate electrodes 612, a plurality of pixel regions and a plurality of first coupling patterns CPL.

The array substrate 600 may include an insulating substrate (not shown) comprising silicon nitride, silicon oxide, and/or other insulating material. The array substrate 600 may further include a gate insulating layer (not shown) and an active layer 614. The gate insulating layer (not shown) is on the insulating substrate (not shown) having the gate line 610 and the gate electrode 612. The active layer 614 is on the gate insulating layer (not shown) corresponding to the gate electrode 612. The active layer 614 comprises a semiconductor layer having amorphous silicon, polysilicon, and/or other semiconductor material, and an impurity-doped (e.g., implanted) semiconductor layer having N+ amorphous silicon, N+ polysilicon, and/or other doped material.

The array substrate 600 may include a source line 620 that extends in a longitudinal direction, a source electrode 622 that is electrically connected to the source line 620, and a drain electrode 623 that is spaced apart from the source electrode 622. In some embodiments, the array substrate 600 may include a plurality of source lines 620, a plurality of source electrodes 622 and a plurality of drain electrodes 623. Each of the gate electrodes 612, each of the semiconductor layers, each of the impurity implanted semiconductor layers, each of the source electrodes 622 and each of the drain electrodes 623 form an associated thin film transistor (TFT).

The array substrate 600 may further include a first upper storage pattern 624, a first extended pattern 625, a second coupling pattern 626, a second extended pattern 627 and a second upper storage pattern 628. In some embodiments, the array substrate 600 may further include a plurality of first upper storage patterns 624, a plurality of first extended patterns 625, a plurality of second coupling patterns 626, a plurality of second extended patterns 627 and a plurality of second upper storage patterns 628. In this exemplary embodiment, the first upper storage patterns 624, the first extended patterns 625, the second coupling patterns 626, the second extended patterns 627 and the second storage patterns 628 form a drain line.

In particular, the first upper storage pattern 624 is electrically connected to the drain electrode 623, and the first upper storage pattern 624 is on the first lower storage pattern STL1. The first extended pattern 625 is electrically connected to the first upper storage pattern 624 on a central line of the pixel region in a longitudinal direction of the pixel line. The second coupling pattern 626 is electrically connected to the first extended pattern 625, and covers the first coupling pattern CPL. The second extended pattern 627 is electrically connected to the first extended pattern 625 on the central line of the pixel region in the longitudinal direction. The second upper storage pattern 628 is electrically connected to the second extended pattern 627, and the second upper storage pattern 628 is on the second lower storage pattern STL2.

The array substrate 600 may further include a passivation layer (not shown) and an organic insulating layer (not shown). The passivation layer (not shown) covers the TFT. The passivation layer (not shown) and the organic insulating layer (not shown) have a contact hole through which the drain electrode 623 is partially exposed. The passivation layer (not shown) and the organic insulating layer (not shown) protect the active layer 614 between the source electrode 622 and the drain electrode 623. The TFT is electrically insulated from a pixel electrode member by the passivation layer (not shown) and the organic insulating layer (not shown). The active layer 614 may include the semiconductor layer and the impurity implanted semiconductor layer.

The array substrate 600 may further include a pixel electrode member that is electrically connected to the second coupling pattern 626 through a contact hole CNTCP.

In particular, the pixel electrode member may include a main electrode 644, a first sub-electrode 642 and a second sub-electrode 646. The main electrode 644 is electrically connected to the second coupling pattern 626 through the contact hole CNTCP. The first sub-electrode 642 is electrically connected to the first lower storage pattern STL1. The second sub-electrode 646 is electrically connected to the second lower storage pattern STL2, and spaced apart from the first sub-electrode 642.

In the illustrated embodiment, the main electrode 644 has two Y-shaped opening patterns that are symmetrical with respect to a central line of the pixel region in the horizontal direction of the pixel region. A central portion of each of the Y-shaped opening patterns has two adjacent rods that form about an interior angle of about 90°.

The first sub-electrode 642 has two linear opening patterns that are substantially parallel to one of the two adjacent rods of each of the Y-shaped opening patterns.

The second sub-electrode 646 has two linear opening patterns that are substantially parallel to another of the two adjacent rods of each of the Y-shaped opening patterns. The linear opening patterns of the first sub-electrode 642 are symmetrical to the linear opening patterns of the second sub-electrode 646 with respect to the central line. In operation of an LCD device including array substrate 600, a plurality of domains is formed adjacent to the opening patterns of the pixel electrode member in a liquid crystal layer positioned between array substrate 600 and a color filter substrate.

The main electrode 644 and the first and second sub-electrodes 642 and 646 comprise a transparent conductive material such as indium tin oxide (ITO), amorphous indium tin oxide (a-ITO), indium zinc oxide (IZO), zinc oxide (ZO), and/or other transparent conductive material.

The domains are formed by the main electrode 644 and the first and second sub-electrodes 642 and 646 so that a rubbing process of the array substrate and/or a color filter substrate may be omitted. In addition, an alignment layer (not shown) may also be omitted.

According to this exemplary embodiment, a total gate-source capacitance is divided into a gate-source capacitance of the gate-source capacitor and an additional gate-source capacitance of the additional gate-source capacitor. The additional gate-source capacitance of the additional gate-source capacitor corresponds to the first and second sub-electrodes 642 and 646. As a result, a kickback voltage of the main electrode 644 is decreased, and the image display quality of the LCD device may be improved.

In addition, the first and second extended patterns 625 and 627 are on the central line of the pixel region to prevent a short circuit between a layer where the source line 620 is formed and a layer where the gate line 610 is formed.

Figure 20:
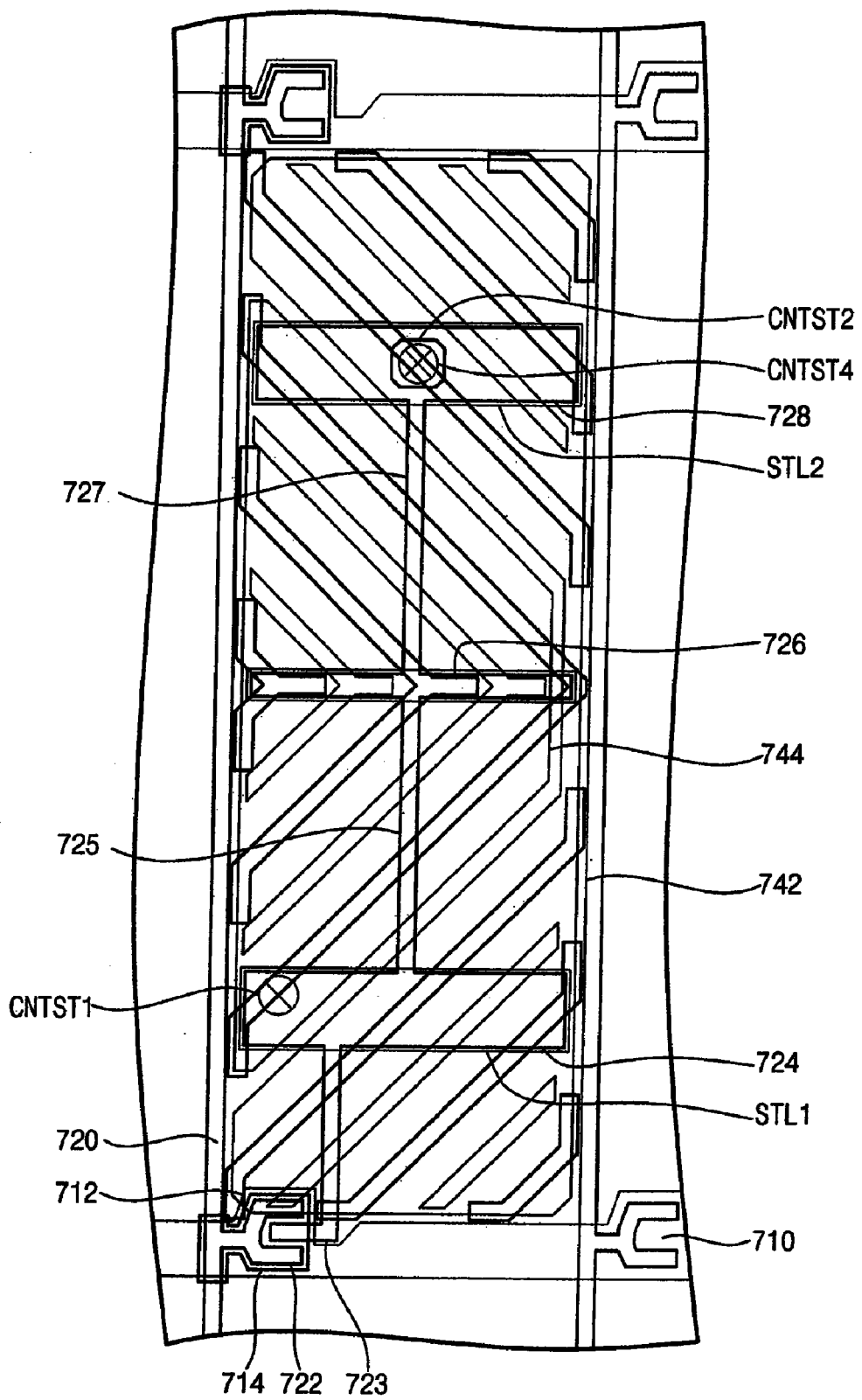
FIG. 20 is a plan view showing an LCD panel in accordance with another exemplary embodiment of the present invention.
Figure 21:
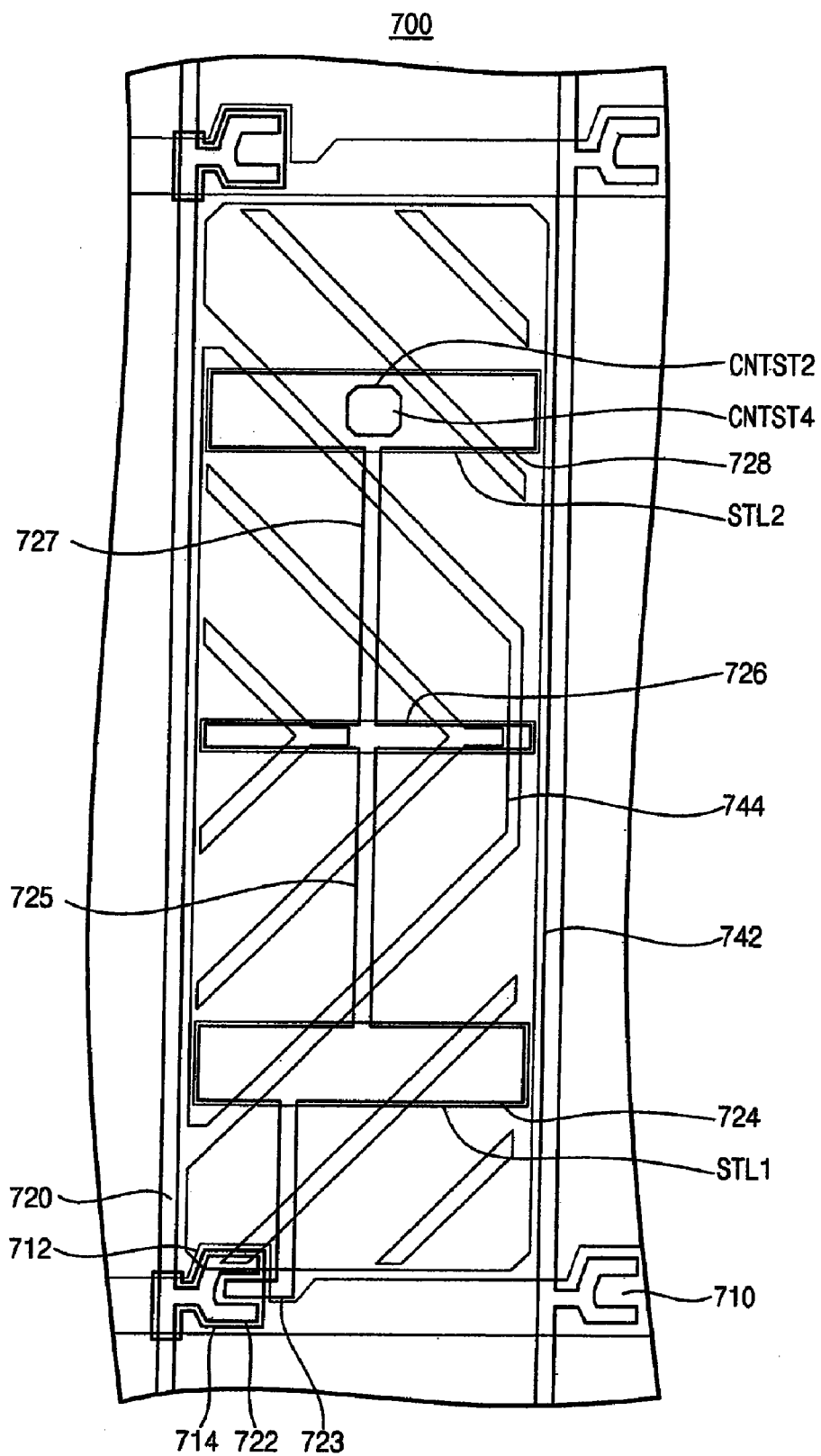
FIG. 21 is a plan view showing an array substrate shown in FIG. 20.

FIG. 20 is a plan view showing an LCD panel in accordance with another exemplary embodiment of the present invention. FIG. 21 is a plan view showing an array substrate shown in FIG. 20. In the illustrated embodiment, contact holes are formed on a drain line spaced apart from the TFT. First and second extended patterns are along a central line of a pixel region in the longitudinal direction of the pixel region.

Referring to FIGS. 20 and 21, the array substrate 700 may include a gate line 710 that extends in a horizontal direction, a gate electrode 712 that is electrically connected to the gate line 710, first and second lower storage patterns STL1 and STL2 that are spaced apart from the gate line 710 in a pixel region and substantially parallel to the gate line 710, and a first coupling pattern CPL that divides the pixel region into two regions. In some embodiments, the array substrate 700 may include a plurality of gate lines 710, a plurality of gate electrodes 712, a plurality of pixel regions and a plurality of first coupling patterns CPL, where pixel regions are defined by consecutive gate lines 210 and data lines 220.

The array substrate 700 may include an insulating substrate (not shown) comprising silicon nitride, silicon oxide, and/or other insulating material. The array substrate 700 may further include a gate insulating layer (not shown) and an active layer 714. The gate insulating layer (not shown) is on the insulating substrate (not shown) having the gate line 710 and the gate electrode 712. The active layer 714 is on the gate insulating layer (not shown) corresponding to the gate electrode 712. The active layer 714 comprises a semiconductor layer having amorphous silicon, polysilicon, and/or other semiconductor material, and an impurity-doped (e.g., implanted) semiconductor layer having N+ amorphous silicon, N+ polysilicon, and/or other doped material.

The array substrate 700 may include a source line 720 that extends in a longitudinal direction, a source electrode 722 that is electrically connected to the source line 720 and a drain electrode 723 that is spaced apart from the source electrode 722. In some embodiments, the array substrate 700 may include a plurality of source lines 720, a plurality of source electrodes 722 and a plurality of drain electrodes 723. Each of the gate electrodes 712, each of the semiconductor layers, each of the impurity implanted semiconductor layers, each of the source electrodes 722 and each of the drain electrodes 723 form an associated thin film transistor (TFT).

The array substrate 700 may further include a first upper storage pattern 724, a first extended pattern 725, a second coupling pattern 726, a second extended pattern 727 and a second upper storage pattern 728. In some embodiments, the array substrate 700 may further include a plurality of first upper storage patterns 724, a plurality of first extended patterns 725, a plurality of second coupling patterns 726, a plurality of second extended patterns 727 and a plurality of second upper storage patterns 728. In this exemplary embodiment, the first upper storage patterns 724, the first extended patterns 725, the second coupling patterns 726, the second extended patterns 727 and the second storage patterns 728 form a drain line.

In particular, the first upper storage pattern 724 is electrically connected to the drain electrode 723, and the first upper storage pattern 724 is on the first lower storage pattern STL1. The first extended pattern 725 is electrically connected to the first upper storage pattern 724 on a central line of the pixel region in a longitudinal direction of the pixel region. The second coupling pattern 726 is electrically connected to the first extended pattern 725, and covers the first coupling pattern CPL. The second extended pattern 727 is electrically connected to the first extended pattern 725 on the central line of the pixel region in the longitudinal direction. The second upper storage pattern 728 is electrically connected to the second extended pattern 727, and the second upper storage pattern 728 is on the second lower storage pattern STL2.

The array substrate 700 may further include a passivation layer (not shown) and an organic insulating layer (not shown). The passivation layer (not shown) covers the TFT. The passivation layer (not shown) and the organic insulating layer (not shown) have a contact hole through which the drain electrode 723 is partially exposed. The passivation layer (not shown) and the organic insulating layer (not shown) protect the active layer 714 between the source electrode 722 and the drain electrode 723. The TFT is electrically insulated from a pixel electrode member by the passivation layer (not shown) and the organic insulating layer (not shown). The active layer 714 may include the semiconductor layer and the impurity implanted semiconductor layer.

The array substrate 700 may further include a pixel electrode member that is electrically connected to the second coupling pattern 726 through a contact hole CNTCP.

In particular, the pixel electrode member may include a main electrode 742 and a sub-electrode 744. The sub-electrode 744 has a wedge shape that is protruded toward a right side of the pixel region. The main electrode 742 is on a remaining portion of the pixel region where the sub-electrode 744 is not formed.

In the illustrated embodiment, the sub-electrode 744 has two Y-shaped opening patterns that are symmetrical with respect to a central line of the pixel region in the horizontal direction of the pixel region. A central portion of each of the Y-shaped opening patterns has two adjacent rods that form an interior angle of about 90°. The sub-electrode 744 is divided into a plurality of portions by the Y-shaped opening patterns. Each of the portions of the sub-electrode 744 has a substantially constant width.

The main electrode 742 has four linear opening patterns. Two of the linear opening patterns are substantially parallel to an upper one of the two adjacent rods of each of the Y-shaped opening patterns. The remaining two of the linear opening patterns are substantially parallel to a lower one of the two adjacent rods of each of the Y-shaped opening patterns. The two linear opening patterns that are substantially parallel to the upper one of the two adjacent rods of each of the Y-shaped opening patterns are symmetrical to the remaining two linear opening patterns that are substantially parallel to the lower one of the two adjacent rods of each of the Y-shaped opening patterns with respect to the central line.

In operation of an LCD device including array substrate 700, a plurality of domains is formed adjacent to the opening patterns of the pixel electrode member in the liquid crystal layer positioned between array substrate 700 and a color filter substrate.

The main electrode 742 and the sub-electrodes 744 comprise a transparent conductive material such as indium tin oxide (ITO), amorphous indium tin oxide (a-ITO), indium zinc oxide (IZO), zinc oxide (ZO), and/or other transparent conductive material.

According to this exemplary embodiment, a total gate-source capacitance is divided into a gate-source capacitance of the gate-source capacitor and an additional gate-source capacitance of the additional gate-source capacitor. The additional gate-source capacitance of the additional gate-source capacitor corresponds to the sub-electrode 742. As a result, a kickback voltage of the main electrode 744 is decreased, and the image display quality of the LCD device is improved.

In addition, the number of the contact holes on an organic insulating layer is only two, which may improve the reliability of the LCD device, as described below.

In the exemplary embodiment described herein, one contact hole is formed between a layer where the gate line 710 is formed and a layer where the source line 720 is formed, and another contact hole is formed between a layer where the pixel electrode member is formed and the layer where the source line 720 is formed. Other configurations of LCD devices have three contact holes: one contact hole between a layer where a gate line is formed and a layer where a source line is formed, and another two contact holes between a layer where the pixel electrode member is formed and the layer where the source line is formed. Since each contact hole increases the probability that a short circuit may be formed, the illustrated embodiment reduces the probability of a short circuit between the layer where the gate line 710 is formed and the layer where the source line 720 is formed. A short circuit between the layer where the gate line 710 is formed and the layer where the source line 720 is formed may cause a malfunction of the LCD device.

In addition, only one sub-electrode is formed in each pixel region in the illustrated embodiment. That is, the number of the sub-electrodes is decreased so that the array substrate 200 may be easily tested. This may decrease a manufacturing time of the LCD device.

Furthermore, the first and second extended patterns 725 and 727 are on the central line of the pixel region to prevent a short circuit between a layer where the source line 720 is formed and a layer where the gate line 710 is formed.

In this exemplary embodiment, one TFT is formed in each pixel region. In some embodiments, a plurality of TFTs may be formed in each pixel region.

Figure 22:
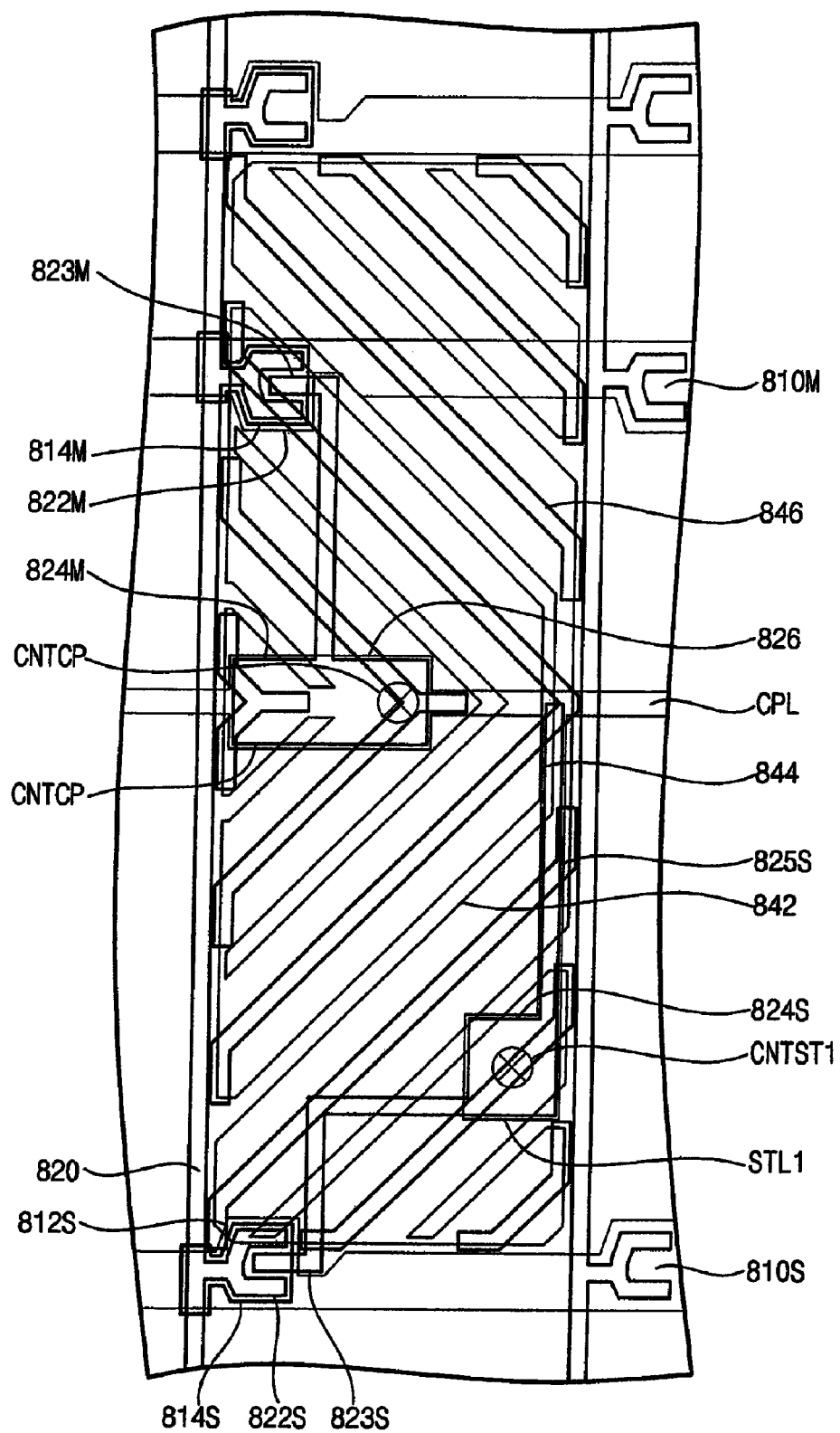
FIG. 22 is a plan view showing an LCD panel in accordance with another exemplary embodiment of the present invention.
Figure 23:
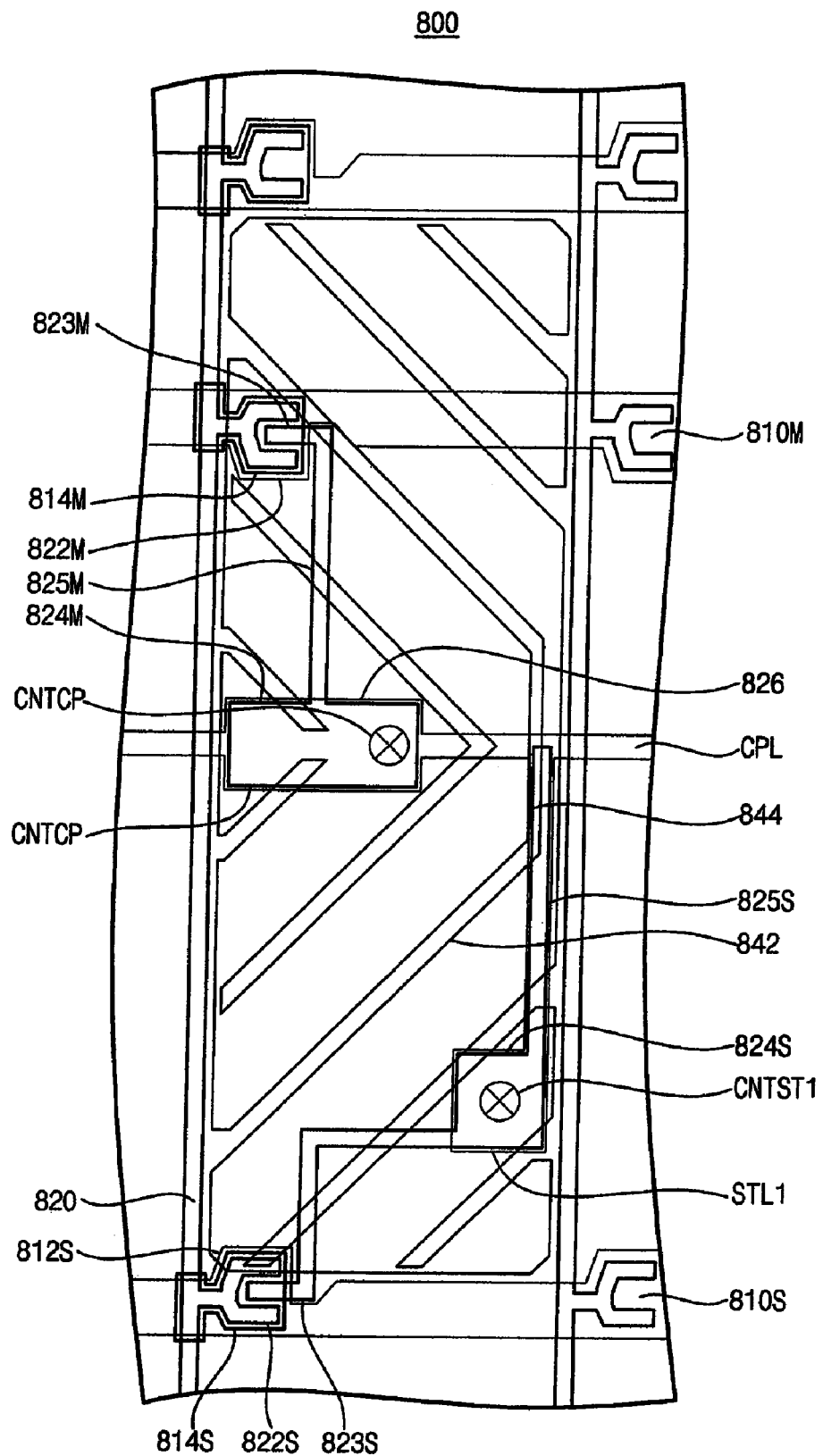
FIG. 23 is a plan view showing an array substrate shown in FIG. 22.

FIG. 22 is a plan view showing an LCD panel in accordance with another exemplary embodiment of the present invention. FIG. 23 is a plan view showing an array substrate shown in FIG. 22. In the illustrated embodiment, two TFTs are formed on each pixel region. A main pixel is on a central portion of the pixel region, and a sub-pixel is on a peripheral portion of the pixel region.

Referring to FIGS. 22 and 23, the array substrate 800 may include first and second gate lines 810M and 810S that are extended in a horizontal direction, first and second gate electrodes 812M and 812S that are electrically connected to the first and second gate lines 810M and 810S, respectively, a first lower storage pattern STL that is spaced apart from the first and second gate lines 810M and 810S in the pixel region and substantially perpendicular to the first gate line 810M, and a first coupling pattern CPL that divides the pixel region into two regions. The first coupling pattern CPL is electrically connected to the first lower storage pattern STL adjacent to a right side of the pixel region. In some embodiments, the array substrate 800 may include a plurality of first lower storage patterns STL and a plurality of first coupling patterns CPL.

The array substrate 800 may include an insulating substrate (not shown) comprising silicon nitride, silicon oxide, and/or other insulating material. The array substrate 800 may further include a gate insulating layer (not shown) and first and second active layers 814M and 814S. The gate insulating layer (not shown) is on the insulating substrate (not shown) having the first and second gate lines 810M and 810S and the first and second gate electrodes 812M and 812S. The first and second active layers 814M and 814S are on the gate insulating layer (not shown) corresponding to the first and second gate electrodes 812M and 812S, respectively. Each of the first and second active layers 814M and 814S comprises a semiconductor layer having amorphous silicon, polysilicon, and/or other semiconductor material, and an impurity-doped (e.g., implanted) semiconductor layer having N+ amorphous silicon, N+ polysilicon, and/or other doped material.

The array substrate 800 may include a source line 820 that extends in a longitudinal direction, first and second source electrodes 822M and 822S that are electrically connected to the source line 820, and first and second drain electrodes 823M and 823S that are spaced apart from the first and second source electrodes 822M and 822S. In some embodiments, the array substrate 800 may include a plurality of source lines 820. Each of the first gate electrodes 812M, each of the semiconductor layers, each of the impurity implanted semiconductor layers, each of the first source electrodes 822M and each of the first drain electrodes 823M form an associated main TFT. Each of the second gate electrodes 812S, each of the semiconductor layers, each of the impurity implanted semiconductor layers, each of the second source electrodes 822S and each of the second drain electrodes 823S form an associated sub-TFT.

The array substrate 800 may further include a first extended pattern 825M that is electrically connected to the first drain electrode 823M and adjacent to a left side of the pixel region, a first upper storage pattern 824M that is electrically connected to the first extended pattern 825M and on the first coupling pattern CPL, a second upper storage pattern 824S that is electrically connected to the second drain electrode 823S and on the first lower storage pattern STL, and a second extended pattern 825S that is electrically connected to the second upper storage pattern 824S and adjacent to a right side of the pixel region. In some embodiments, the array substrate 800 may further include a plurality of first extended patterns 825M, a plurality of first upper storage patterns 824M, a plurality of second upper storage patterns 824S, and a plurality of second extended patterns 825S. In this exemplary embodiment, the first upper storage patterns 824M and the first extended patterns 825M form a first drain line, and the second upper storage patterns 824S and the second extended pattern 825S form a second drain line.

The array substrate 800 may further include a second coupling pattern 826 that is electrically connected to the first drain electrode 823M and covers the first coupling pattern CPL. In some embodiments, the array substrate 800 may further include a plurality of second coupling patterns 826.

The array substrate 800 may further include a passivation layer (not shown) and an organic insulating layer (not shown). The passivation layer (not shown) covers the main TFT and the sub-TFT. The passivation layer (not shown) and the organic insulating layer (not shown) have contact holes through which the second upper storage pattern 824S and the second coupling pattern 826 are partially exposed.

The passivation layer (not shown) and the organic insulating layer (not shown) protect the first active layer 814M between the first source electrode 822M and the first drain electrode 823M, and the second active layer 814S between the second source electrode 822S and the second drain electrode 823S. The main TFT and the sub-TFT are electrically insulated from a pixel electrode member by the passivation layer (not shown) and the organic insulating layer (not shown). Each of the first and second active layers 814M and 814S may include the semiconductor layer and the impurity implanted semiconductor layer.

The array substrate 800 may further include a main electrode 844 and a sub-electrode 842. The main electrode 844 is electrically connected to the second coupling pattern 826 through a contact hole CNTCP. The sub-electrode 842 is electrically connected to the second storage pattern 824S through a first contact hole CNTST1.

The main electrode 844 has a wedge shape that is protruded toward a right side of the pixel region. The sub-electrode 842 is on a remaining portion of the pixel region where the main electrode 844 is not formed.

The main electrode 844 has two V-shaped opening patterns that are symmetrical with respect to a central line of the pixel region in the horizontal direction of the pixel region. End portions of the smaller one of the V-shaped opening patterns are opened, and a central portion of the smaller one of the V-shaped opening patterns is closed. A central portion of the larger one of the V-shaped opening patterns is opened. A central portion of each of the V-shaped opening patterns has two adjacent rods that form an interior angle of about 90°. The main electrode 844 is divided into a plurality of portions by the V-shaped opening patterns. The divided portions of the main electrode 844 are electrically connected to one another. Each of the portions of the main electrode 844 has a substantially constant width.

The sub-electrode 842 has four linear opening patterns. Two of the linear opening patterns are substantially parallel to an upper one of the two adjacent rods of each of the Y-shaped opening patterns. The remaining two of the linear opening patterns are substantially parallel to the lower one of the two adjacent rods of each of the Y-shaped opening patterns. The two linear opening patterns that are substantially parallel to the upper one of the two adjacent rods of each of the Y-shaped opening patterns are symmetrical to the remaining two linear opening patterns that are substantially parallel to the lower one of the two adjacent rods of each of the Y-shaped opening patterns with respect to the central line.

In operation of an LCD device including an array substrate 800, a plurality of domains is formed adjacent to the opening patterns of the pixel electrode member in the liquid crystal layer.

The main electrode 844 and the sub-electrodes 842 comprise a transparent conductive material such as indium tin oxide (ITO), amorphous indium tin oxide (a-ITO), indium zinc oxide (IZO), zinc oxide (ZO), and/or other transparent conductive material.

The domains are formed by the main electrode 844 and the sub-electrode 842 so that a rubbing process of the array substrate and/or a color filter substrate may be omitted. In addition, an alignment layer (not shown) may also be omitted.

According to embodiments of the present invention, a total gate-source capacitance is divided into a gate-source capacitance of the gate-source capacitor and an additional gate-source capacitance of the additional gate-source capacitor. The additional gate-source capacitance of the additional gate-source capacitor corresponds to the sub-electrode. As a result, a kickback voltage of the main electrode is decreased, and the image display quality of the LCD device may be improved.

Additionally, the sub-pixel portion displays black between a zero gray-scale and a middle gray-scale, thereby decreasing an afterimage of a low gray-scale.

Furthermore, the number of the contact holes on an organic insulating layer is decreased, which may improve the reliability of the LCD device.

In the embodiment discussed herein, one contact hole is formed between a layer where the gate line is formed and a layer where the source line is formed, and another contact hole is formed between a layer where the pixel electrode member is formed and the layer where the source line is formed. Other configurations of LCD devices have three contact holes: one contact hole between a layer where a gate line is formed and a layer where a source line is formed, and another two contact holes between a layer where the pixel electrode member is formed and the layer where the source line is formed. Since each contact hole increases the probability that a short circuit may be formed, the illustrated embodiment reduces the probability of a short circuit between the layer where the gate line is formed and the layer where the source line is formed.

In addition, only one sub-electrode is formed in each pixel region. That is, the number of the sub-electrodes, is decreased so that the array substrate may be easily tested, and a manufacturing time of the LCD device may be decreased.

Furthermore, a portion of the drain line is on the central line of the pixel region, which may decrease the probability of a short circuit between the source line and the drain line.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. An array substrate comprising:
an insulating substrate;
a switching transistor comprising a gate electrode, a source electrode and a drain electrode on the insulating substrate in a pixel region;
a gate line electrically coupled to the gate electrode;
a data line electrically coupled to the source electrode;
a main pixel electrode formed in the center region of the pixel region and electrically coupled to the drain electrode;
a sub-pixel electrode formed in an edge region of the pixel region; and
a coupling capacitor electrically coupling the drain electrode and the sub-pixel electrode.

2. The array substrate of claim 1, wherein a portion of the sub-pixel electrode overlaps a portion of the gate line.

3. The array substrate of claim 2, wherein the pixel region is longitudinal shape and the sub-pixel electrode is disposed in both ends of the pixel region.

4. The array substrate of claim 3, wherein a plurality of opening patterns are formed in the main pixel electrode and the sub-pixel electrode.

5. The array substrate of claim 4, wherein two Y-shaped opening patterns are formed on the main electrode, and wherein each of the Y-shaped opening patterns is symmetrical with respect to a central line of the pixel region in a horizontal direction of the pixel region.

6. The array substrate of claim 5, wherein two linear opening patterns that are substantially parallel to one of two adjacent rods of each of the Y-shaped opening patterns are formed on the first sub-electrode.

7. The array substrate of claim 6, wherein two linear opening patterns that are substantially parallel to another of the two adjacent rods of each of the Y-shaped opening patterns are formed on the second sub-electrode, and wherein the two linear opening patterns that are formed on the first sub-electrode are symmetrical to the two linear opening patterns that are formed on the second sub-electrode with respect to the central line of the pixel region in the horizontal direction of the pixel region.

8. The array substrate of claim 7, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

9. The array substrate of claim 8, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

10. The array substrate of claim 1, wherein the pixel region is longitudinal shape and the sub-pixel electrode is disposed in both ends of the pixel region.

11. The array substrate of claim 10, wherein a plurality of opening patterns are formed in the main pixel electrode and the sub-pixel electrode.

12. The array substrate of claim 11, wherein two Y-shaped opening patterns are formed on the main electrode, and wherein each of the Y-shaped opening patterns is symmetrical with respect to a central line of the pixel region in a horizontal direction of the pixel region.

13. The array substrate of claim 12, wherein two linear opening patterns that are substantially parallel to one of two adjacent rods of each of the Y-shaped opening patterns are formed on the first sub-electrode.

14. The array substrate of claim 13, wherein two linear opening patterns that are substantially parallel to another of the two adjacent rods of each of the Y-shaped opening patterns are formed on the second sub-electrode, and wherein the two linear opening patterns that are formed on the first sub-electrode are symmetrical to the two linear opening patterns that are formed on the second sub-electrode with respect to the central line of the pixel region in the horizontal direction of the pixel region.

15. The array substrate of claim 14, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

16. The array substrate of claim 15, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

17. The array substrate of claim 1, wherein a plurality of opening patterns are formed in the main pixel electrode and the sub-pixel electrode.

18. The array substrate of claim 17, wherein two Y-shaped opening patterns are formed on the main electrode, and wherein each of the Y-shaped opening patterns is symmetrical with respect to a central line of the pixel region in a horizontal direction of the pixel region.

19. The array substrate of claim 18, wherein two linear opening patterns that are substantially parallel to one of two adjacent rods of each of the Y-shaped opening patterns are formed on the first sub-electrode.

20. The array substrate of claim 19, wherein two linear opening patterns that are substantially parallel to another of the two adjacent rods of each of the Y-shaped opening patterns are formed on the second sub-electrode, and wherein the two linear opening patterns that are formed on the first sub-electrode are symmetrical to the two linear opening patterns that are formed on the second sub-electrode with respect to the central line of the pixel region in the horizontal direction of the pixel region.

21. The array substrate of claim 20, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

22. The array substrate of claim 21, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

23. The array substrate of claim 1, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

24. The array substrate of claim 23, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

25. The array substrate of claim 1, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

26. The array substrate of claim 25, further comprising:
a second storage capacitance,
wherein the second storage capacitance has a fifth terminal electrode and a sixth terminal electrode, the fifth terminal electrode is formed with the data line layer and contacts to the sub-pixel electrode, and the sixth terminal electrode is formed with the gate line layer.

27. An array substrate comprising:
an insulating substrate;
a switching transistor comprising a gate electrode, a source electrode and a drain electrode on the insulating substrate in a pixel region;
a gate line electrically coupled to the gate electrode;
a data line electrically coupled to the source electrode;
a main pixel electrode electrically coupled to the drain electrode;
a sub-pixel electrode formed in the pixel region; and
a coupling capacitor electrically coupling the drain electrode and the sub-pixel electrode,
wherein a portion of the sub-pixel electrode overlaps a portion of the gate line.

28. The array substrate of claim 27, wherein the pixel region is longitudinal shape and the sub-pixel electrode is disposed in both ends of the pixel region.

29. The array substrate of claim 28, wherein a plurality of opening patterns are formed in the main pixel electrode and the sub-pixel electrode.

30. The array substrate of claim 29, wherein two Y-shaped opening patterns are formed on the main electrode, and wherein each of the Y-shaped opening patterns is symmetrical with respect to a central line of the pixel region in a horizontal direction of the pixel region.

31. The array substrate of claim 30, wherein two linear opening patterns that are substantially parallel to one of two adjacent rods of each of the Y-shaped opening patterns are formed on the first sub-electrode.

32. The array substrate of claim 31, wherein two linear opening patterns that are substantially parallel to another of the two adjacent rods of each of the Y-shaped opening patterns are formed on the second sub-electrode, and wherein the two linear opening patterns that are formed on the first sub-electrode are symmetrical to the two linear opening patterns that are formed on the second sub-electrode with respect to the central line of the pixel region in the horizontal direction of the pixel region.

33. The array substrate of claim 32, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

34. The array substrate of claim 33, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

35. The array substrate of claim 27, wherein a plurality of opening patterns are formed in the main pixel electrode and the sub-pixel electrode.

36. The array substrate of claim 35, wherein two Y-shaped opening patterns are formed on the main electrode, and wherein each of the Y-shaped opening patterns is symmetrical with respect to a central line of the pixel region in a horizontal direction of the pixel region.

37. The array substrate of claim 36, wherein two linear opening patterns that are substantially parallel to one of two adjacent rods of each of the Y-shaped opening patterns are formed on the first sub-electrode.

38. The array substrate of claim 37, wherein two linear opening patterns that are substantially parallel to another of the two adjacent rods of each of the Y-shaped opening patterns are formed on the second sub-electrode, and wherein the two linear opening patterns that are formed on the first sub-electrode are symmetrical to the two linear opening patterns that are formed on the second sub-electrode with respect to the central line of the pixel region in the horizontal direction of the pixel region.

39. The array substrate of claim 38, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

40. The array substrate of claim 39, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

41. The array substrate of claim 27, wherein a first terminal electrode of the coupling capacitor is formed with the gate line layer, a second terminal electrode of the coupling capacitor is formed with the data line layer, and the sub-pixel electrode contacts to the first terminal electrode through a hole in the second terminal electrode.

42. The array substrate of claim 41, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

43. The array substrate of claim 27, further comprising:
a first storage capacitance,
wherein the first storage capacitance has a third terminal electrode and a forth terminal electrode, the third terminal electrode is formed with the data line layer and contacts to the main pixel electrode, and the forth terminal electrode is formed with the gate line layer.

44. The array substrate of claim 43, further comprising:
a second storage capacitance,
wherein the second storage capacitance has a fifth terminal electrode and a sixth terminal electrode, the fifth terminal electrode is formed with the data line layer and contacts to the sub-pixel electrode, and the sixth terminal electrode is formed with the gate line layer.

45. An array substrate comprising:
an insulating substrate having a pixel region;
a main gate line on the pixel region;
a main switch on the insulating substrate, the main switch being electrically connected to the main gate line;
a main pixel electrode positioned on a central portion of the pixel region, the main pixel electrode being electrically connected to the main switch;
a sub-gate line on the pixel region;
a sub-switch on the insulating substrate, the sub-switch being electrically connected to the sub-gate line; and
a sub-pixel electrode being on a peripheral portion of the pixel region.

46. The array substrate of claim 45, further comprising:
a main storage capacitance electrically coupled to the main pixel electrode; and
a sub storage capacitance electrically coupled to the sub pixel electrode,
wherein the main storage capacitance and the sub storage capacitance is electrically connected to each other.

47. The array substrate of claim 46,
wherein the main switch and the sub switch are transistors comprising gate electrodes, source electrodes and drain electrodes, the main storage capacitance comprises a first lower terminal electrode a first upper terminal electrode, the sub storage capacitance comprises a second lower terminal electrode and a second upper terminal electrode, and the first upper terminal is formed with the same layer to the source electrode.

48. An array substrate comprising:
an insulating substrate having a pixel region;
a main gate line on the pixel region;
a main switch on the insulating substrate, the main switch being electrically connected to the main gate line;
a main pixel electrode electrically connected to the main switch;
a sub-gate line on the pixel region;
a sub-switch on the insulating substrate, the sub-switch being electrically connected to the sub-gate line; and
a sub-pixel electrode electrically connected to the sub-switch,
wherein the sub-pixel electrode overlaps the main gate line.

49. The array substrate of claim 48, further comprising:

a main storage capacitance electrically coupled to the main pixel electrode; and a sub storage capacitance electrically coupled to the sub pixel electrode, wherein the main storage capacitance and the sub storage capacitance is electrically connected to each other.

50. The array substrate of claim 49, wherein the main switch and the sub switch are transistors comprising gate electrodes, source electrodes and drain electrodes, the main storage capacitance comprises a first lower terminal electrode a first upper terminal electrode, the sub storage capacitance comprises a second lower terminal electrode and a second upper terminal electrode, and the first upper terminal is formed with the same layer to the source electrode.

* * * * *